US008424083B2

(12) United States Patent
Fukata et al.

(10) Patent No.: US 8,424,083 B2
(45) Date of Patent: Apr. 16, 2013

(54) CONTROLLING ACTIVATION OF AN APPLICATION PROGRAM IN AN AUDIO SIGNAL PROCESSING SYSTEM

(75) Inventors: Ayumi Fukata, Hamamatsu (JP); Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 192 days.

(21) Appl. No.: 12/896,736

(22) Filed: Oct. 1, 2010

(65) Prior Publication Data

US 2011/0083178 A1    Apr. 7, 2011

(30) Foreign Application Priority Data

Oct. 1, 2009    (JP) ................................ 2009-229941

(51) Int. Cl.
   *G06F 21/00*    (2006.01)

(52) U.S. Cl.
   USPC ................... 726/21; 726/26; 726/29; 726/30; 713/187; 713/323; 380/237; 380/238; 455/221; 705/908; 709/219; 709/249

(58) Field of Classification Search .................... 726/21, 726/29
   See application file for complete search history.

(56) References Cited

U.S. PATENT DOCUMENTS

| | | | | |
|---|---|---|---|---|
| 5,978,855 | A * | 11/1999 | Metz et al. ................... | 709/249 |
| 2001/0008421 | A1 * | 7/2001 | Nishimura et al. ........... | 348/232 |
| 2002/0046216 | A1 * | 4/2002 | Yamazaki et al. ............ | 707/201 |
| 2002/0172362 | A1 * | 11/2002 | Wonfor et al. ................ | 380/201 |
| 2002/0186961 | A1 * | 12/2002 | Kikuchi et al. ................ | 386/98 |
| 2004/0039923 | A1 * | 2/2004 | Koskins ........................ | 713/189 |
| 2006/0079968 | A1 * | 4/2006 | Takemura et al. ............. | 700/48 |
| 2006/0212546 | A1 * | 9/2006 | Kishimoto .................... | 709/219 |
| 2006/0294501 | A1 * | 12/2006 | Ueda ............................. | 717/120 |
| 2009/0290850 | A1 * | 11/2009 | Hickman et al. ............... | 386/94 |
| 2010/0318783 | A1 * | 12/2010 | Raj et al. ...................... | 713/150 |

FOREIGN PATENT DOCUMENTS

JP    07-122944 A    5/1995

OTHER PUBLICATIONS

Julien et al, "Power consumption modeling and characterization of the TI C6201", Micro, IEEE, Sep.-Oct. 2003, p. 40-49.*
European Search Report mailed Sep. 7, 2012, for EP Application No. 10183303.6, seven pages.

* cited by examiner

*Primary Examiner* — Morshed Mehedi
(74) *Attorney, Agent, or Firm* — Morrison & Foerster LLP

(57) ABSTRACT

User operates a selection switch to instruct temporary activation of an application. For the application of which the temporary activation has been instructed, a CPU of a console allocates resources necessary for signal processing by a DSP of an engine and for a parameter editing function of the console. In the DSP, a bypass parameter is set to ON. Thus, there is provided a state capable of accepting various parameter setting operation related to the application, but the signal processing based on the application program is prevented from being started in a substantive manner. In response to a full activation instruction of an application via a full activation instruction switch, the bypass parameter is set to OFF, so that audio signal processing based on the application can be started. In this way, preparatory work for setting parameters related to the application can be performed efficiently.

4 Claims, 7 Drawing Sheets

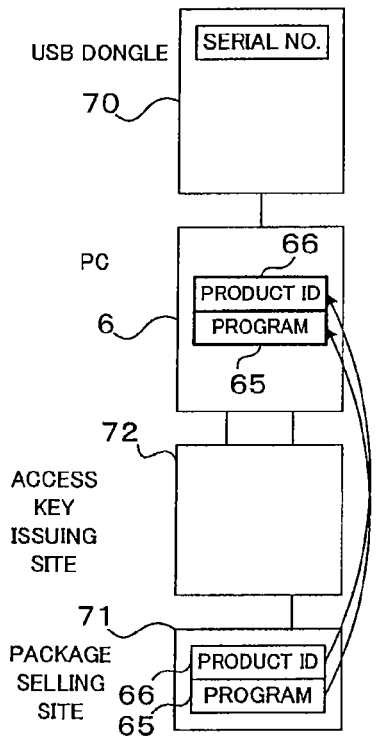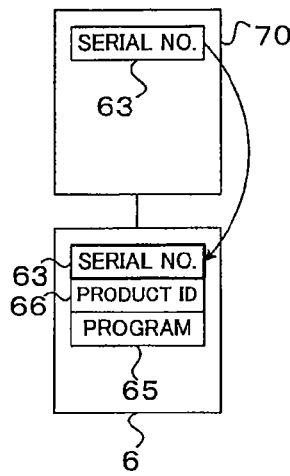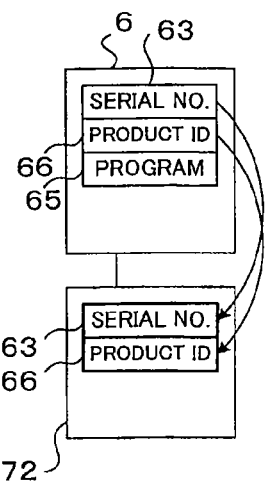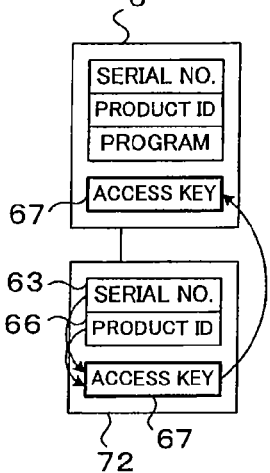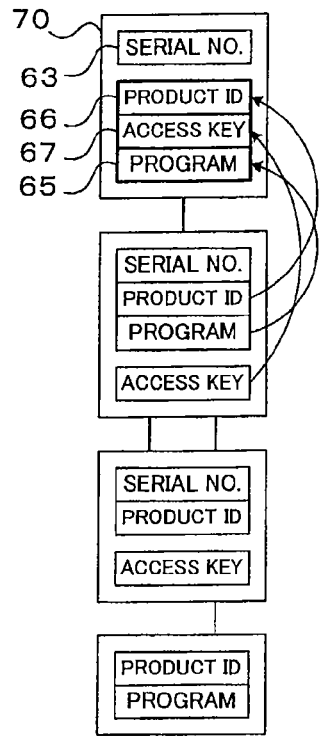
F I G. 5 A
F I G. 5 B
F I G. 5 C
F I G. 5 D
F I G. 5 E

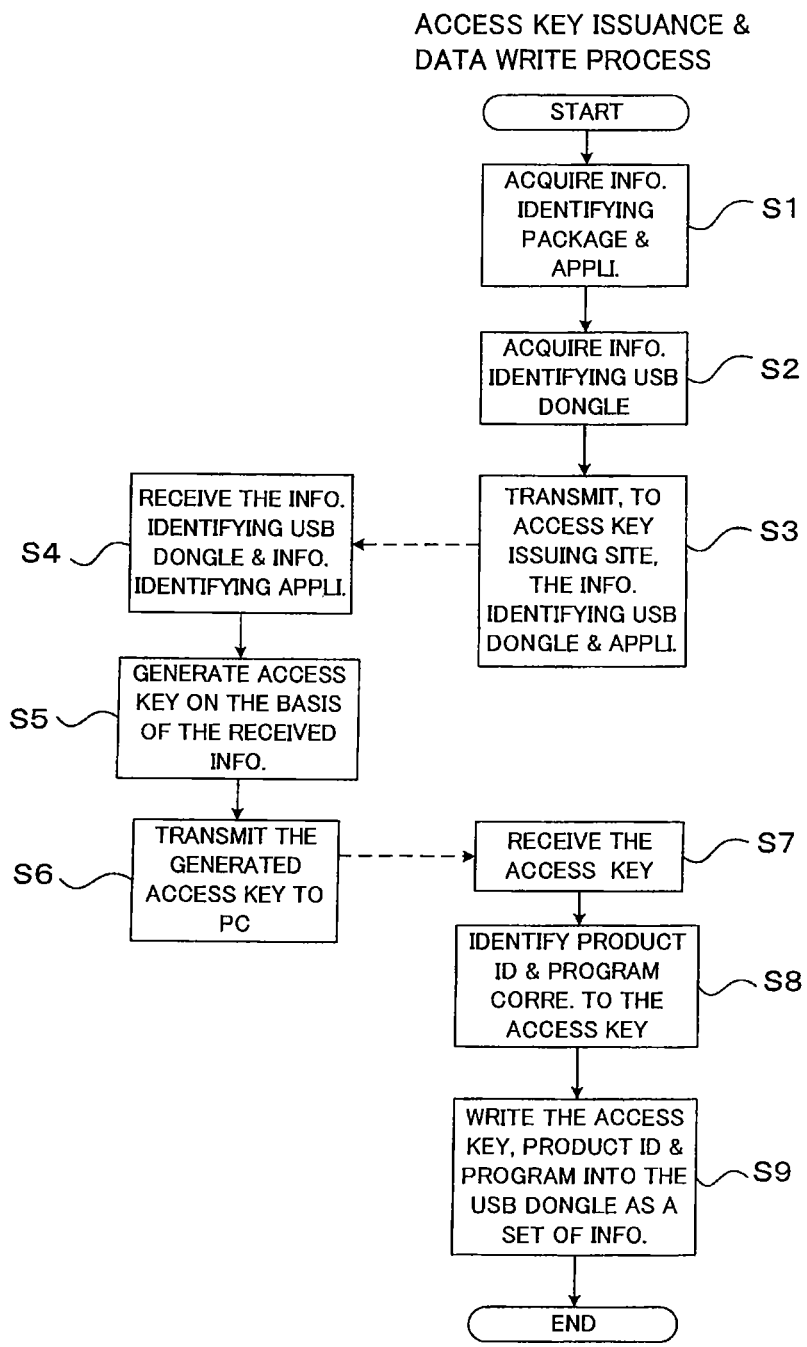
F I G. 6

CONTROLLING ACTIVATION OF AN APPLICATION PROGRAM IN AN AUDIO SIGNAL PROCESSING SYSTEM

BACKGROUND

The present invention relates to audio signal processing apparatus for performing signal processing on audio signals based on an application program, and more particularly to a technique for controlling activation of an application program.

Heretofore, there have been known digital audio mixers of a type having an effect imparting application program prestored in an internal memory. The prestored application program has to be subjected to license management for purposes like preventing unauthorized use of the application program.

Among the conventionally-known license management techniques for an application program pre-installed in a digital audio mixer is one in accordance with which data of a license (i.e., access key) authorizing activation of the program to be license-managed is purchased via the Internet and the thus-purchased access key is recorded into an internal memory of the mixer, as disclosed, for example, in Japanese Patent Application Laid-open Publication No. 2005-056216.

With the aforementioned conventionally-known technique, however, the application program cannot be used at all before the license (access key) is duly written into equipment that uses the application program. Among examples of the application program used in a digital mixer is a program for performing effect processing on audio signals. Activation of such an effect processing program allows a user to perform the effect processing on audio signals in the mixer and set effect processing parameters using a graphical user interface. However, with the conventionally-known technique, the user without a predetermined license cannot use either the function of performing the effect processing on audio signals or the function of setting effect processing parameters.

Namely, with the conventionally-known technique, the user cannot set parameters for the equipment employing the application program before a predetermined license is written into the equipment. Thus, at a stage prior to actual use of the application program (i.e., before audio signal processing based on the program is started), the program cannot be used, for example, to set parameters as preparatory work. As a consequence, the conventionally-known technique would provide only poor work efficiency.

SUMMARY OF THE INVENTION

In view of the foregoing, it is an object of the present invention to provide a technique for allowing preparatory work for setting parameters, related to an application program for use in an audio signal processing apparatus, to be performed efficiently.

In order to accomplish the above-mentioned object, the present invention provides an improved audio signal processing apparatus, which comprises: an input section which inputs an audio signal to said audio signal processing apparatus; a signal processing section which performs signal processing, based on an application program, on the audio signal input via said input section; an output section which outputs the audio signal having been subjected to the signal processing by said signal processing section; a parameter editing section which accepts operation for changing a value of a parameter to be used in the signal processing; a temporary activation instruction section which accepts a temporary activation instruction for temporarily activating an application program; a temporary activation start section which, when the temporary activation instruction has been accepted by said temporary activation instruction section, starts, for the application program of which the temporary activation has been instructed, the signal processing by said signal processing section and acceptance, by said parameter editing section, of parameter change operation, but also sets data indicative of an activation state of the application program, of which the temporary activation has been instructed, to "currently in a temporary activation state" and sets a bypass parameter of the application program to ON; a full activation instruction section which accepts a full activation instruction for fully activating an application program; an authorization section which, when the full activation instruction of the application program has been accepted by said full activation instruction section, confirms presence of an access key corresponding to the application program of which the full activation has been instructed and authorizes the full activation of the application program of which the full activation has been instructed; and a full activation start section which, when the full activation of the application program has been authorized by said authorization section, sets data indicative of an activation state of the application program, of which the full application has been authorized, to "currently in a full activation state" and sets the bypass parameter of the application program, of which the full application has been authorized, to OFF.

When temporary activation of an application program has been instructed by a user, the temporary activation start section starts, for the application program of which the temporary activation has been instructed, the signal processing by said signal processing section and acceptance, by the parameter editing section, of parameter change operation, to thereby provide a state capable of accepting parameter change operation related to the application program. Thus, use of the application can be started. But, at the same time, the temporary activation start section also sets data indicative of an activation state of the application program, of which the temporary activation has been instructed, to "currently in a temporary activation state" and sets the bypass parameter of the application program to ON. Thus, it is facilitated to appropriately control any action of the signal processing section, the output section, or the like according to the "currently in a temporary activation state" and the ON state of the bypass parameter to fit the temporary activation state. For example, in the temporary activation state, it may be realized that the audio signal having been subjected to the signal processing by the signal processing section would be prevented from being taken out from the output section. Through the temporary activation of the application, for example, the present invention allows the user to perform parameter editing operation (i.e., parameter change operation) related to the application, with a limitation of not being able to start the signal processing on an audio signal, while effectively preventing unauthorized use of the application. When the full activation of the application program has been instructed by the user, the full activation start section sets data indicative of an activation state of the application program, of which the full application has been authorized, to "currently in a full activation state" and sets the bypass parameter of the application program, of which the full application has been authorized, to OFF. Thus, it is facilitated to appropriately control any action of the signal processing section, the output section, or the like according to the "currently in a full activation state" and the OFF state of the bypass parameter to fit the full activation state. For example, in the full activation state, startup of the signal processing, by the signal processing section, on an audio signal may be permitted.

Preferably, the audio signal processing apparatus may further comprises a bypass section which, when the bypass parameter is OFF, causes said signal processing section to perform the signal processing on the audio signal input via said input section and outputs the audio signal, having been subjected to the signal processing, via said output section, and which, when the bypass parameter is ON, outputs the audio signal, input via said input section, via said output section without causing said signal processing section to perform the signal processing on the input audio signal.

In the state of "currently in a temporary activation state", the bypass section forms a bypass so that the audio signal, input via the input section, to the signal processing section is output via the output section without being subjected to the signal processing by the signal processing section; thus, the signal processing by the signal processing section is invalidated. In the state of "currently in a full activation state", the bypass section forms an ordinary path so that the audio signal, input via the input section, is subjected to the signal processing by the signal processing section, and thus, the audio signal having been subjected to the signal processing based on the application is output via the output section.

According to the present invention, which is constructed to permit temporary activation of an application program, the user can perform parameter setting operation for the application program at a stage prior to the full activation of the application program which requires license authentication etc. (i.e. before startup of the signal processing based on the application). As a result, the present invention can advantageously achieve an enhanced efficiency of preparatory work for the application program.

The present invention may be constructed and implemented not only as the apparatus invention as discussed above but also as a method invention. Also, the present invention may be arranged and implemented as a software program for execution by a processor such as a computer or DSP, as well as a storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIGS. 3A to 3D are block diagrams explanatory of example hardware constructions of system component apparatus constituting the mixing system of FIG. 1, of which FIG. 3A shows a construction of a console, FIG. 3B shows a construction of an engine, FIG. 3C shows a construction of an I/O apparatus and FIG. 3D shows a construction of a personal computer;

FIGS. 5A to 5E are block diagrams explanatory of data transition occurring until the content shown in FIG. 4 is written into the USB dongle;

FIG. 6 is a flow chart explanatory of an access key issuance and data write process on the USB dongle;

DETAILED DESCRIPTION

<Overall Construction of Mixing System>

Figure 1:
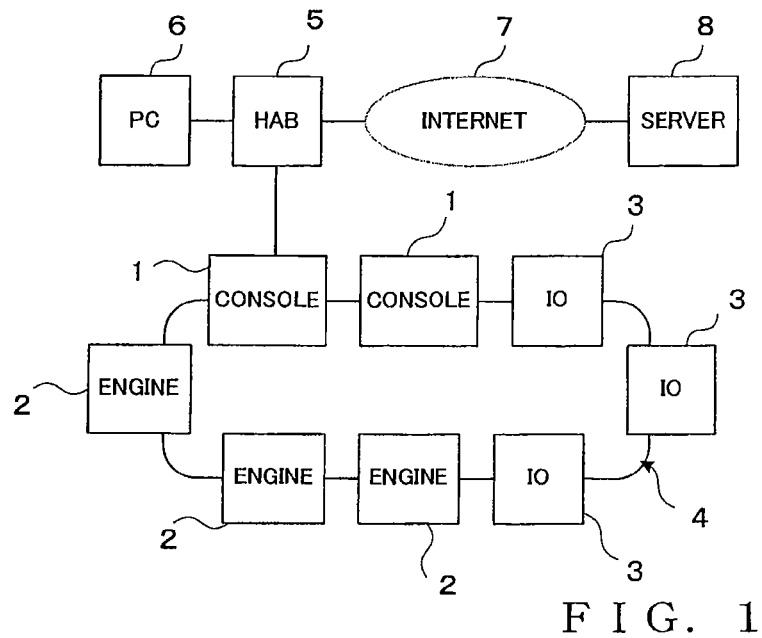
FIG. 1 is a block diagram explanatory of a general construction of an embodiment of a mixing system to which is applied the present invention.

FIG. 1 is a block diagram explanatory of an example general construction of an embodiment of a mixing system to which is applied the present invention. This mixing system comprises a plurality of system component apparatus (nodes) including a plurality of types of audio signal processing apparatus, such as consoles 1, mixing engines 2 and I/O apparatus 3. Of the system component apparatus, apparatus, such as consoles 1, mixing engines 2 and I/O apparatus 3, which share later-described audio signal lines (audio signals), will hereinafter be referred to as "audio signal processing apparatus", to distinguish from other system component apparatus, such as a PC 6, than the audio signal processing apparatus. Namely, the mixing system comprises a group of all of the audio signal processing apparatus interconnected via an audio network and sharing all of the audio signal lines and all of the other system component apparatus (nodes) connected, via a computer network, to the audio signal processing apparatus sharing the audio signal lines. In the mixing system, the plurality of types of audio signal processing apparatus cooperate to implement mixing processing on audio signals of a plurality of channels. Thus, it is possible to construct a system of an extremely large scale (i.e., having a great number of channels). In the illustrated example of FIG. 1, the system of FIG. 1 includes, as the audio signal processing apparatus, two consoles 1, three engines 2 and three I/O apparatus 3. However, for convenience of description, the same types of audio signal processing apparatus are depicted by the same reference numerals in the drawings, and the following description will be given assuming that the mixing system includes only system component apparatus per type, i.e. one console 1, one engine 2 and one I/O apparatus 3.

<Audio Network Connection>

The audio network 4 is a ring-shaped network formed by sequentially connecting between the audio signal processing apparatus 1-3 using network cables of the Ethernet (registered trademark) standard. Such connections between the audio signal processing apparatus via the audio network 4 will hereinafter referred to as "audio network connections (AN connections)". Each of the AN-connected audio signal processing apparatus 1-3 can transmit audio signals of a plurality of channels to another audio signal processing apparatus in substantially real time using audio signal lines of a plurality of channels provided by the audio network 4. The AN-connected audio signal processing apparatus 1-3 share all of the audio signal lines of the audio network 4 (i.e., all audio signals communicated using all of the audio signal lines). In other words, each of the AN-connected audio signal processing apparatus 1-3 can transmit any audio signal, output therefrom, to any one of the other audio signal processing apparatus, and each of the AN-connected audio signal processing apparatus 1-3 can receive any audio signal output from any one of the other audio signal processing apparatus.

All of the audio signal processing apparatus 1 to 3 sharing all of the audio signal lines provide by the audio network 4 (i.e., all of the AN-connected audio signal processing apparatus) have respective mechanisms capable of recognizing the mixing system which they belong to. For example, a unique system number is assigned to each mixing system and each of the audio signal processing apparatus 1 to 3 stores, in its memory, the unique system number of the mixing system, so that each of the audio signal processing apparatus 1 to 3 can recognize the mixing system which it belongs to.

<Computer Network Connection>

A personal computer (PC) 6 is connected to the console 1 via a hub 5. In the instant embodiment, the PC 6, which is a system component apparatus other than the audio signal processing apparatus (hereinafter referred to as "non-audio-signal-processing system component apparatus") is constructed to be incapable of being connected to the audio network 4. Thus, the connection between the PC 6 (non-audio-signal-processing system component apparatus) and the console 1 (audio signal processing apparatus) will hereinafter be referred to as "computer network connection" or "CN connection" to distinguish from the audio network connection (AN connection). The CN connection is an ordinary type of LAN (Local Area Network) connection. Primarily, control signals (control data) are communicated between the CN-connected console 1 (audio signal processing apparatus) and PC 6 (system component apparatus). Thus, for example, the console 1 can be remote-controlled from the PC 6 CN-connected with the console 1. Also, in the CN connection, no audio signal line is established, and thus, no audio signal is shared between the CN-connected console 1 and PC 6. Note that an audio signal can be communicated in an ordinary LAN connection (herein referred to as "CN connection") between the console 1 and the PC 6 using a conventionally-known audio signal communication protocol, such as the VoIP (Voice over Internet Protocol). However, the communication speed and bandwidth in the CN connection are extremely slower and narrower than those in the AN connection. Therefore, it is difficult to share an audio signal while securing realtimeness with the audio signal communication performed in the AN connection using an audio signal communication protocol for use in an ordinary LAN connection. Thus, the instant embodiment is constructed to not establish any audio signal line in the CN connection.

The PC 6 is configured as a system component apparatus which belongs to the mixing system although it does not share any audio signal line with each of the audio signal processing apparatus of the mixing system. The PC 6 is set to belong to only one mixing system. For example, as a typical way for the PC 6 to recognize the one mixing system which the PC 6 belongs to, information uniquely identifying the console 1 (i.e., other party) in the CN connection may be stored in the memory of the PC 6 in such a manner that the CN-connected console 1 and PC 6 can communicate with each other directly. One example of the information uniquely identifying the other party of the CN connection may be an MAC (Media Access Control) address, IP address or the like. By identifying the other party of the CN connection on the basis of such information uniquely identifying the other party of the CN connection, the PC 6 can recognize the mixing system which the PC 6 (and the other party of the CN connection) belong to. The other party of the PC 6, i.e. the console 1, also stores in its memory information uniquely identifying the PC 6 in the CN connection, so that console 1 can recognize that the PC 6 among various apparatus CN-connected thereto belongs to the mixing system. Thus, even where the PC 6 is physically connected with an audio signal processing apparatus belonging to a different mixing system from the console 1, the PC 6 does not redundantly belong to a plurality of mixing systems.

<Internet Connection>

Further, the PC 6 is connected to the Internet 7 via the hub 5, so that the PC 6 can communicate various data with a server computer 8 via the Internet 7. Interconnecting the apparatus via the Internet 7 like this will hereinafter be referred to as "Internet connection" to distinguish from other connections. The PC 6 can access a Web site provided by the server computer 8, to acquire a program, data, etc. from the Web site via the Internet 7. In the system configuration of FIG. 1, the console 1 too is connected to the Internet 7 via the hub 5 and thus can communicate various data with the server computer 8 via the Internet 7.

<Modification of the Construction of the Mixing System>

Whereas the mixing system of FIG. 1 has been described in relation to the case where the PC 6 is CN-connected to the console 1 via the hub 5, the PC 6 may be CN-connected directly to the console 1. In this case too, the PC 6 can recognize the mixing system it belongs to, by having information (MAC or IP address) uniquely identifying the console 1 CN-connected with the PC 6 as noted above.

<Overview of Behavior of the Mixing System>

The console 1 functions as a system control apparatus for controlling overall operation of the entire mixing system, which accepts various parameter setting operation by a user and transmits instructions (control data), corresponding to the received parameter setting operation, to other audio signal processing apparatus 2 and 3 via the audio network 4 to thereby remote-control behavior of the other audio signal processing apparatus 2 and 3. On the basis of the instruction given from the console 1, the engine 2 performs signal processing, such as mixing processing, on audio signals input from outside via the I/O apparatus 3. The audio signals, having been subjected to the signal processing by the engine 2, are output to outside via the I/O apparatus 3. Further, on the console 1, the user can monitor content (values of parameters etc.) of the signal processing being performed by the engine 2, and various data, such as input/output levels of audio signals in the I/O apparatus 3.

The PC 6 executes a DAW (Digital Audio Workstation) software program so that it can function as a system control apparatus for controlling overall operation of the entire mixing system similarly to the console 1. Namely, the PC 6, functioning as a system control apparatus, accepts various parameter setting operation by a user and transmits instructions (control data), responsive to the accepted parameter setting operation, to other audio signal processing apparatus 2 and 3 via the audio network 4 to thereby remote-control behavior of the other audio signal processing apparatus 2 and 3.

<Mixing Processing on Audio Signals>

Figure 2:
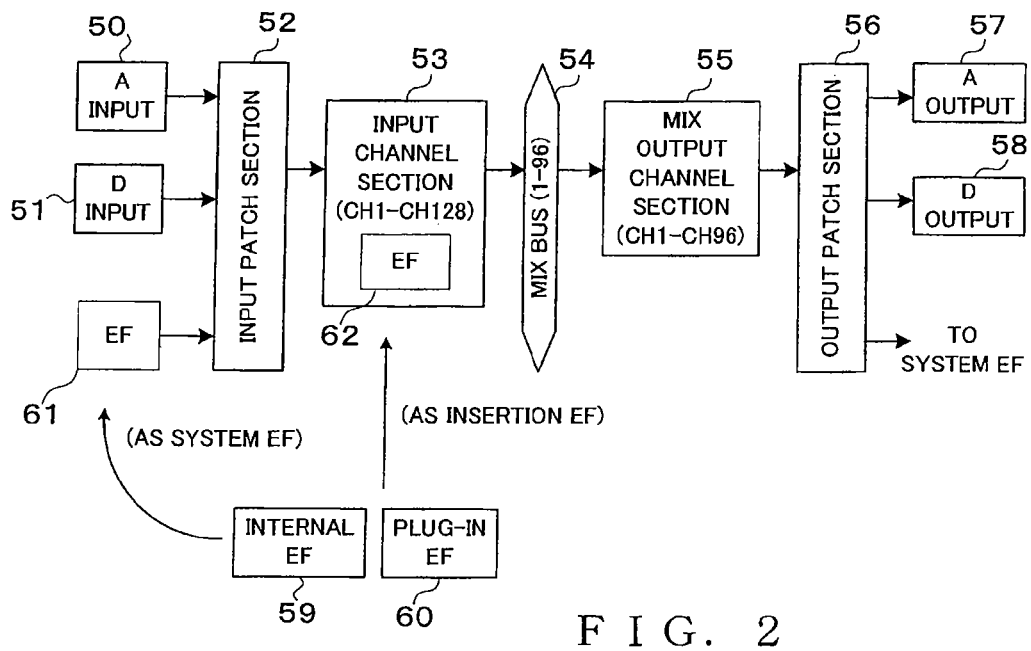
FIG. 2 is a block diagram explanatory of audio signal processing performed in the mixing system of FIG. 1.

FIG. 2 is a block diagram explanatory of individual operations of the mixing processing performed on audio signals in the mixing system shown in FIG. 1. The operations of the mixing processing are implemented through cooperation among the console 1, engine 2 and I/O apparatus 3 that are audio signal processing apparatus of the mixing system.

An analog input ("A input") section 50 is provided for inputting analog audio signals from analog audio signal input sources, such as microphones, various musical instruments and music reproduction (play) apparatus. A digital input ("D input") section 51 is provided for inputting digital audio signals from digital audio signal input sources, such as digital music equipment. The A input and D input sections 50 and 51 are implemented by audio signal input functions of the audio signal processing apparatus 1 to 3 (particularly, the audio signal input function of the I/O apparatus 3). Each analog audio signal input via the analog input section 50 is converted at predetermined sampling period and then supplied to an input patch section 52. Each digital audio signal input via the digital input section 51 is supplied to the input patch section 52 after being subjected to digital conversion, such as format conversion, as necessary.

The system control apparatus (console 1) sets the input patch section 52 to allocate the input signals, supplied from the individual input sections (A input and D input sections 50 and 51), to input channels of an input channel section 53 provided at a stage following the input patch section 52. Here, the term "patch" refers to allocating an output destination to an input source (i.e., connecting an output destination to an input source). Each output destination can be allocated to only one input source and cannot be allocated to two input sources at the same time. A user can input desired patch setting instructions via the system control apparatus (console 1). In the mixing system, desired patch settings, such as one for allocating an input signal of the I/O apparatus 3 to an input channel of the engine 2, can be made via the audio network 4. In this case, the patch settings include, in addition to the settings for allocating output destinations to input sources, path settings of audio signal communication lines (i.e., settings as to which audio signals are to be transmitted via which audio signal communication lines) in the audio network 4.

The input channel section 53 comprises a plurality of (e.g., 128) input channels, each of which is a signal processing channel that performs signal processing, including level adjustment, equalizing, effect impartment, etc., on each input digital audio signal and outputs the resultant processed audio signal to a MIX bus section 54 provided at a stage following the input channel section 53. The MIX bus section 54 comprises a plurality of (e.g., 96) bus lines, and one or more output signals of one or more input channels of the input channel section 53 are output to each of the bus lines of the MIX bus section 54. Each of the bus lines of the MIX bus section 54 mixes together the one or more output signals and outputs the resultant mixed signal (mixed result) to a MIX output channel section 55. The output channel section 55 comprises a plurality of output channels provided in corresponding relation to the bus lines of the MIX bus section 54. Each of the output channels of the output channel section 55 performs signal processing, such as level adjustment, on the audio signal supplied from the corresponding bus line. These input channel section 53, MIX bus section 54 and output channel section 55 are implemented by processing of microprograms executed by a DSP section (which will be later described in relation to FIG. 3) of the engine 2.

An output signal of each of the output channels of the MIX output channel section 55 is supplied to an output patch section 56. The output patch section 56 makes settings for allocating the supplied output signals of the output channels to output sections provided at a stage following the output patch section 56. The output sections in the illustrated example are an analog output (A output) section 57 and a digital output (D output) section 58. The A output section 57 converts each digital audio signal, supplied from the output patch section 56, into an analog audio signal and outputs the converted analog audio signal to any one of external output destinations, such as headphones, speakers, amplifiers, recorders, etc. The D output section 58 performs, as necessary, digital conversion, such as format conversion, on each digital audio signal supplied from the output patch section 56, and then outputs the converted audio signal to any one of external output destinations, such as audio equipment having a digital audio signal input.

Further, a built-in or internal effecter (internal EF) 59 and plug-in effecter (plug-in EF) 60 are implemented by microprograms for causing the DSP (FIG. 3) of the engine 2 to perform effect impartment processing (i.e., effect processing) on an audio signal. The internal EF 59 is a program pre-installed in the engine 2 prior to factory shipment. The plug-in EF 60 is an application program additionally installed by a user; namely, the plug-in EF 60 is a program made available by the user purchasing a license of the program separately from purchase of the apparatus. The internal EF 59 and plug-in EF 60 each contain microprograms corresponding to a plurality of types of effects.

The internal EF 59 and plug-in EF 60 can be used as a system effecter (system EF) 61 and insertion effecter (insertion EF) 62, respectively. The system effecter 61 performs the effect processing on an output signal of the output patch section 56 (i.e., output signal of the MIX output channel section 55) and then outputs the resultant effect-imparted signal to the input patch section 52. On the other hand, the insertion EF 62 is an effecter inserted in the input channel section 53 and performs effect processing on an audio signal being processed in the input channel section 53 of usable effects.

The user can select a desired effect type from the internal EF 59 and plug-in EF 60 and allocate the selected effect type to the system EF 61 or insertion EF 62. The DSP of the engine 2 operates on the basis of the microprograms corresponding to the selected effect type to thereby implement the system EF 61 or insertion EF 62. Because arithmetic resources of the DSP of the engine 2, a total number of effects usable as the system EF 61 and insertion EF 62 is set in advance, and the internal EF 59 and plug-in EF 60 are allocated to the system EF 61 and insertion EF 62 within the range of the total number.

<Hardware Construction of Each of the Apparatus>

Figure 3A:
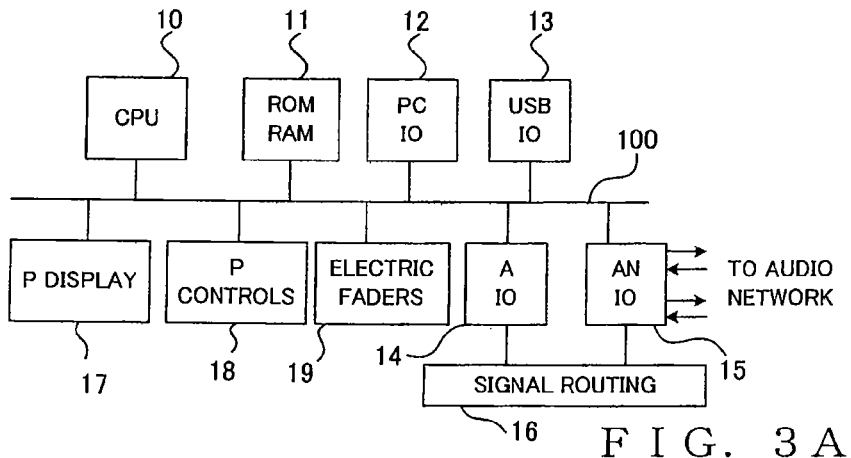
Figures 3B, 3C:
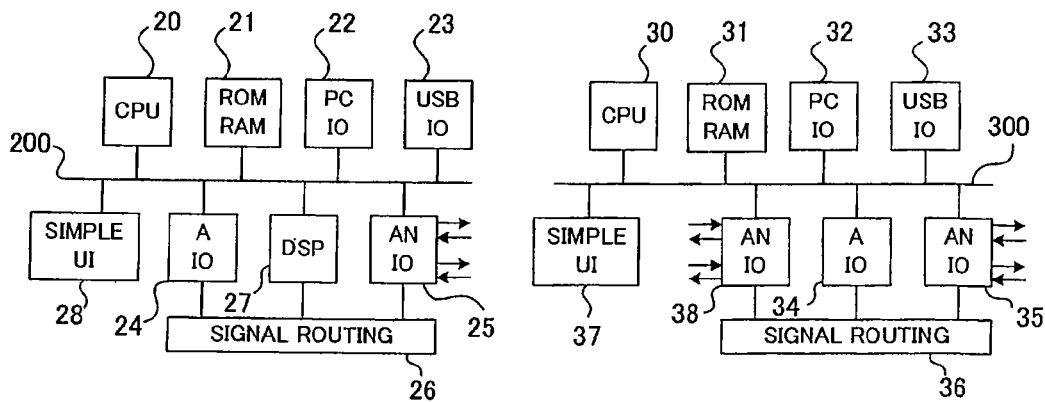
Figure 3D:
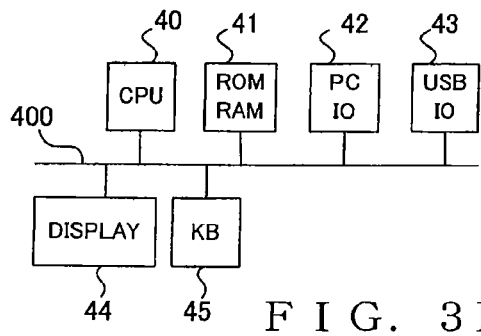

FIGS. 3A to 3D are block diagrams explanatory of an example hardware construction of each of the apparatus constituting the mixing system, of which FIG. 3A shows the console 1, FIG. 3B shows the engine 2, FIG. 3C shows the I/O apparatus 3 and FIG. 3D shows the PC 6.

<Construction Common to all of the Apparatus>

In FIGS. 3A to 3D, a CPU 10, 20, 30 or 40, a memory 11, 21, 31 or 41 including a ROM (Read-Only Memory) and RAM (Random Access Memory), and a USB terminal (USB I/O) 13, 23, 33 or 43 are components common to all of the audio signal processing apparatus (console 1, engine 2 and I/O apparatus 3) and the apparatus other than the audio signal processing apparatus, i.e. non-audio-signal processing system component apparatus (PC 6). In each of the apparatus, the individual components (blocks) are connected to the CPU 10, 20, 30 or 40 via a CPU bus 100, 200, 300 or 400 in such a manner that data can be communicated between the components (blocks) and the CPU 10, 20, 30 or 40. The CPU 10, 20, 30 or 40 executes control programs, stored in the memory 11, 21, 31 or 41, to thereby control overall operation of the entire apparatus.

Each of the computer network terminals (PC I/Os) 12, 22, 32 and 42 is an interface for CN-connecting the audio signal processing apparatus 1-3 and non-audio-signal-processing system component apparatus (PC 6). Also, each of the PC I/Os) 12, 22, 32 and 42 can also be used to connect the audio signal processing apparatus 1-3 and PC 6 to the Internet 7.

Further, the console 1 and the PC 6 are connected to the Internet 7 via the hub 5 connected to their respective PC I/Os 12 and 42.

Each of the USB terminals (USB I/Os) 13, 23, 33 and 43 is an interface for connecting, to the audio signal processing apparatus 1-3 or PC 6, peripheral equipment (USB apparatus) for reading and writing data using the USB (Universal Serial Bus) standard. Because each of the audio signal processing apparatus 1-3 and PC 6 belonging to the mixing system has its USB terminal 13, 23, 33 or 43, a "USB dongle" can be detachably connected to each of the audio signal processing apparatus 1-3 and PC 6. Further, each of the audio signal processing apparatus 1-3 and PC 6 can write and read data to and from the USB dongle connected thereto. The "USB dongle" will be described in detail later.

<Construction Common to all of the Audio Signal Processing Apparatus>

Each of the console 1 of FIG. 3A, engine 2 of FIGS. 3B and I/O apparatus 3 of FIG. 3C is provided with an audio terminal (A I/O) 14, 24 or 34 and an audio network terminal (AN I/O) 15, 25 or 35. The audio terminals (A I/Os) 14, 24 and 34 are each an interface for inputting and outputting audio signals and correspond to the A input section 50, D input section 51, A output section 57 and D output section 58. The audio network terminals (AN I/Os) 15, 25 and 35 are each an interface for connecting the audio signal processing apparatus 1-3 in question to the audio network 4. Each of the audio signal processing apparatus 1-3 can communicate (i.e., transmit and receive) various data with the other audio signal processing apparatus, connected to the audio network 4, via its AN I/O 15, 25 or 35.

In each of the audio signal processing apparatus 1-3, the A I/O 14, 24 or 34 and the AN I/O 15, 25 or 35 are interconnected via a respective signal routing audio bus 16, 26 or 36, and thus, digital audio signals (sample waveform data) can be transmitted, per sampling period, between the A I/O 14, 24 or 34 and the AN I/O 15, 25 or 35 via the signal routing audio bus 16, 26 or 36.

<Construction of the Console>

As shown in FIG. 3A, the console 1 is provided with a display ("P display") section 17 provided on an operation panel, panel controls ("P controls") 18 via which the user can perform various operation (or which accept various user's operation), and sound volume level adjusting controls 19 for adjusting sound volume levels of audio signals of individual channels. These elements provided in the console 1 function as a parameter editing section. The display section 17, which is for example in the form of a liquid crystal display, displays various information on the basis of display control signals given from the CPU 10 via the CPU bus 100. The panel controls 18 are a multiplicity of controls provided on the operation panel. Each of the sound volume level adjusting controls 19 is for example in the form of a so-called electric fader F, which has a knob portion whose operating position is electrically controlled by the CPU 10. The A I/O 14 of the console 1 includes a microphone input terminal, a headphone output terminal, etc.

The user can set various parameters for the signal processing to be performed by the engine 2, make patch settings, etc. by use of the panel display section 17, panel controls 18 and sound volume level adjusting controls 19 of the console 1, namely the parameter editing section. The CPU 10 of the console 1 generates remote-controlling data in response to operation of any of the panel display section 17, panel controls 18 and sound volume level adjusting controls 19. The memory 11 of the console 1 includes a current buffer area for storing therein settings (setting values) of various parameters for remote-controlling the signal processing to be performed by the engine 2, and the stored content of the current buffer area is updated with the remote-controlling data generated by the CPU 10 in response to operation by the user. The stored content of the current buffer area is transmitted to other system component apparatus, constituting the mixing system, via the audio network 4 so that it is reflected in various settings in the other system component apparatus.

<Construction of the Engine>

As shown in FIG. 3B, the engine 2 is provided with a signal processing (DSP (Digital Signal Processor)) section 27 that performs the signal processing on audio signals. The DSP section 27 may comprise either a single DSP or a plurality of DSPs interconnected via a bus so that the signal processing can be performed distributively by the plurality of DSPs. The DSP section 27 is connected to the A I/O 24 and AN I/O 25 via the signal routing audio bus 26, so that digital audio signals (sample waveform data) of a plurality of channels can be communicated, per sampling period, between the DSP section 27 and the A I/O 24 and AN I/O 25. Further, a simple user interface ("simple UI") 28 is a user interface including, among other things, a power switch and operation-checking LED indicators. Further, the A I/O 24 of the engine 2 includes a microphone input terminal, a headphone output terminal, etc.

Audio signals of a plurality of channels input via the A I/O 24 and AN I/O 25 (mainly, audio signals input from the I/O apparatus 3) are supplied, per sampling period, to the DSP section 27 via the signal routing audio bus 26. The DSP section 27 performs, per sampling period, signal processing, based on microprograms, on the audio signals (sample waveform data) of the plurality of channels supplied via the signal routing audio bus 26. The signal processing performed by the DSP section 27 includes mixing processing (i.e., processing by the input channel section 53, MIX bus section 54 and MIX output channel section 55 of FIG. 2) on the audio signals, and effect processing (i.e., effect processing (system EF 61 and insertion EF 62) using the internal EF 59 and plug-in EF 60) on the audio signals. The mixing processing and effect processing (namely, signal processing on audio signals) will hereinafter be referred to collectively as "audio signal processing".

Various parameters for the audio signal processing to be performed by the DSP section 27 are controlled on the basis of remote-controlling data generated by the console 1 (i.e., stored content of the current buffer area). The remote-controlling data generated by the console 1 are supplied to the engine 2 via the audio network 4. In the engine 2, the remote-controlling data are supplied to the DSP section 27 via the AN I/O 25. Audio signals (sample waveform data) of a plurality of channels are supplied, per sampling period, to the AN I/O 25 or A I/O 24 via the signal routing audio bus 26, so that the audio signals are output via the AN I/O 25 to other audio signal processing apparatus (I/O apparatus 3 etc.) on the network 4 or output via the A I/O 24 to a headphone output terminal (monitoring output).

<Construction of the I/O Apparatus>

In the I/O Apparatus 3 of FIG. 3C, the A I/O 34 is an interface for inputting or outputting analog audio signals or digital audio signals of a multiplicity of channels. The A I/O 34 is implemented by a card having an analog audio signal input function, an analog audio signal output function, or a digital audio signal input/output function. With such a card, a necessary conversion process (A/D conversion, D/A conversion or digital conversion (format conversion)) is performed. The A I/O 34 includes analog audio signal input terminals of a plurality of channels, analog audio signal output terminals of a plurality of channels, or digital audio signal input/output terminals of a plurality of channels. The I/O Apparatus 3 acquires audio signals of a multiplicity of channels from external input sources via the A I/O 34 to supply the acquired audio signals to the signal routing audio bus 36, and outputs audio signals of a multiplicity of channels, acquired from the signal routing audio bus 36, to external output destinations via the A I/O 34.

Further, as shown in FIG. 3C, the I/O Apparatus 3 includes a simple user interface (simple UI) 37. The simple UI 37 is a simple user interface including, among other things, a power switch and operation-checking LED indicators. Further, the I/O Apparatus 3 includes an AN I/O (i.e., "second AN I/O") 38 in addition to the AN I/O 35. By connecting a network cable, connected to the second AN I/O 38, to an AN I/O of another mixing system than the mixing system which the I/O Apparatus 3 belongs to, the two mixing systems can be interconnected. "interconnecting two mixing systems" means allowing the two mixing systems to share some audio signals, or creating a state where the two mixing systems can share some audio signals. However, in such a case too, the I/O Apparatus 3 belongs only to the single mixing system AN-connected therewith via the AN I/O 35, and never belongs to the other mixing system connected therewith via the second AN I/O 38. Another form of "interconnecting two mixing systems" may comprise allowing the two mixing systems to share all audio signals, or creating a state where the two mixing systems can share all audio signals. In this case, the two mixing systems function as a single mixing system.

<Construction of the PC>

The PC 6 is a general-purpose personal computer, and, as shown in FIG. 3D, it includes, as user interfaces, a display section 44 and an operation section ("KB") 45. The display section 44, which is for example in the form of a liquid crystal display, displays information, such as various screens, under control of the CPU 40. The operation section 45 includes a keyboard, mouse, etc. By the CPU 40 executing DAW (Digital Audio Workstation) programs stored in the memory 41, the PC 6 can function as a system control apparatus for controlling overall operation of the entire mixing system similarly to the console 1, as noted earlier.

<USB Dongle>

Here, the "USB dongle", which is a hardware key also called "protect dongle" or "security dongle", is in the form of a small-size, USB-connection-type storage medium having superior portability. The "USB dongle" functions as a license managing storage device, which has a license managing mechanism that permits or authorizes execution (full activation) of an application program, which is to be subjected to license management (to be license-managed), only when the USB dongle is connected to the USB terminal 13, 23, 33 or 43 of any of the system component apparatus (audio signal processing apparatus 1 to 3 and PC 6) constituting the mixing system. In the instant embodiment, the USB dongle has no mechanism, such as a CPU, for performing processing. As will be later described in detail, the USB dongle functions as a license managing storage device by storing therein the application program to be license-managed and an access key (license) for permitting or authorizing execution (full activation) of the application program in association with each other. Namely, although execution (full activation) of the application program to be license-managed is not permitted before authentication of the license (i.e., before authentication with the access key), the application program is allowed to be executed (fully activated) in the mixing system by a later-detailed process performing authentication of the license using the access key recorded in the USB dongle. Note that illustration of the USB dongle is omitted in FIGS. 3A to 3D.

<Serial Number>

Although not shown in FIG. 3, all of the system component apparatus and devices including the USB dongle (i.e. console 1, engine 2, I/O apparatus 3, PC 6 and USB dongle), which constitute the mixing system, have their respective unique serial numbers. Each of the serial numbers is apparatus identification information that identifies the apparatus assigned the serial number. It is preferable that the serial numbers be of a data format common to all of the apparatus. Each of the system component apparatus of the mixing system can identify itself with the serial number assigned thereto.

<Stored Content of the USB Dongle>

Figure 4:
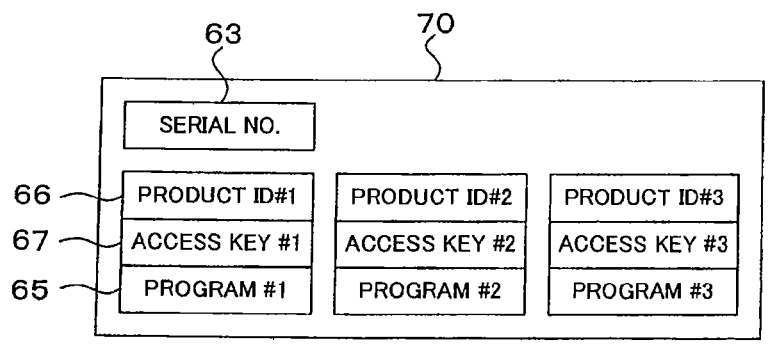
FIG. 4 is a diagram explanatory of stored content of a USB dongle in the mixing system.

FIG. 4 is a conceptual diagram explanatory of the stored content of the USB dongle. As shown, the USB dongle 70 has recorded therein a serial number 63 unique to the hardware device of the USB dongle. The USB dongle 70 also stores therein, as a set of mutually-associated information (i.e., information set) 64, an application program 65 included in an application package purchased by the user, a product ID 66 unique to the application package and an access key 67 for permitting execution (full activation) of the application program 65. A plurality of such information sets (three sets in the illustrated example of FIG. 4) 64 may be recorded in one USB dongle 70. In FIG. 4, numbers "#1", "#2" and "#3" are attached to individual letter strings "product ID", "access key" and "program" to distinguish among the information sets 64. Details of the individual data will be discussed later.

Hereinafter, a product of each application program to be traded will be referred to as "application package". Each "application package" comprises a combination of an application program ("program") 65 and a product ID 66 as illustrated in FIG. 5A. The term "application program" refers only to the application program 65 of the application package. The application program will hereinafter also be referred to simply as "application".

<Purchase of Application Package>

Each time the user additionally purchases an application package and acquires the access key for permitting execution (full activation) of the application program included in the purchased application package, one information set 64 is written into the USB dongle 70 through a write process as set forth below. FIGS. 5A to 5E are block diagrams explanatory of data transition occurring until one information set 64 (application program 65, product ID 66 and access key 67) is recorded into the USB dongle 70.

In FIG. 5A, a package selling site 71 is a Web site on the Internet which sells, as an application package (product), an application program usable in the mixing system. The user can purchase a desired application package by accessing the package selling site 71 from the PC 6 via the Internet.

The user can download the purchased application package from the package selling site 71 to its PC 6. Thus, as shown in FIG. 5A, the application program 65 and product ID 66 (i.e., data indicated by thick line in the figure), constituting the application package transmitted from the package selling site 71, are recorded into the PC 6; a storage destination of the purchased application package (application program 65 and product ID 66) may, for example, be a suitable storage medium, such as a built-in hard disk, of the PC 6. Assume here that a billing process for the purchase of the application package is performed during purchase procedure in the package selling site 71.

<Application Program>

Each application program 65 is an application that adds a predetermined function to the mixing system. In the instant embodiment, it is assumed that the application program 65 is an application for use as a plug-in effecter EF 60 (FIG. 2) that adds an effecter function. The application program 65 contains all programs necessary for execution and control, in the mixing system, of one function (effecter function in this case) possessed by the application program, in the mixing system.

The above-mentioned "all programs" include an installer of the application program, and application programs for use in the individual system component apparatus constituting the mixing system. The application programs for use in the individual system component apparatus are apparatus-specific application programs, i.e. a plurality of types of application programs corresponding to types of functions of the individual system component apparatus, such as a screen displaying GUI (Graphical User Interface) program for use in the console 1, microprograms for use in the DSP section 27 of the engine 2 and a screen displaying GUI program for use in the PC 6. Generally, the application program that adds a predetermined function to the mixing system has no apparatus-specific for use in the I/O apparatus 3; however, if the I/O apparatus 3 has a simple display section or the like provided thereon, then the application program may include a GUI program for use in the I/O apparatus 3.

<Product ID of Application Package>

Each product ID 66 is ID data unique to an application package purchased by the user, and it includes application program identification information (application identification information) identifying the application program contained in the application package. The application identification information is, for example, a name of the application package (application name). In a case where the application is an effect processing application program, the application program identification information may be a name indicative of an effect type, such as "reverberation" or "chorus". For convenience of description, applications having a common or same application name will hereinafter be referred to as "applications of the same type" or "same type of applications".

Because each product ID 66 is ID data unique to an application package, different application packages providing the same type of application have different product IDs 66. Further, because each product ID 66 includes application identification information (application name), even different application packages have part of the product ID 66 (more specifically, part of the application name) in common as long as the application packages provide the same type of application. Thus, on the basis of the product ID 66, it is possible to identify one application package corresponding to the ID 66 and identify one application program 65 corresponding to the application name.

The application program may be acquired by the user acquiring a portable storage medium (e.g., CD-ROM) containing the program, rather than by the user downloading the data from the package selling site 71. Further, the product ID may be acquired physically, for example, from a portable storage medium (e.g., CD-ROM) having recorded therein data of the product ID, a paper medium having written thereon a letter string indicative of the product ID or the like, rather than by the user downloading the data from the package selling site 71.

<Access Key Issuance and Data Write Process on the USB Dongle>

FIG. 6 is a flow chart explanatory of issuance of an access key and the data write process on the USB dongle. The following description will be given in relation to a case where the USB dongle 70 is connected to the USB terminal 43 of the PC 6 and the PC 6 functions as an apparatus for writing data into the USB dongle 70. Namely, the CPU 40 of the PC 6 performs the process of FIG. 6. Note that FIG. 6 shows, in the single flow chart, both a process performed by the CPU 40 of the PC 6 and a later-described process performed in an access key issuing site 72.

At step S1, the CPU 40 of the PC 6 acquires application program identification information (application identification information) for identifying an application program which is to be subjected to license management, i.e. for which an access key is to be issued. In the instant embodiment, the product ID 66 corresponding to the application program is acquired, at step S1, as the application program identification information. Where the application package has been downloaded from the package selling site 71 to the PC 6 as in the illustrated example of FIG. 5A, the CPU 40 of the PC 6 may automatically read out the product ID 66 downloaded and stored into a storage medium, as one example way of acquiring the application identification information. If, for example, the product ID 66 is provided in a printed form (e.g., on a paper medium), then a predetermined input screen provided by the access key issuing site 72 is displayed on the display section 44 of the PC 6, and the user is caused to manually input the product ID 66 to the input screen. Whereas it is assumed here that the product ID 66 (i.e., information identifying the application package) itself is acquired at step S1 as the application identification information, the present invention is not so limited, and only the application identification information (application name) identifying the application program may be acquired (e.g., an operation for extracting the application name from the product ID may be performed).

At step S2, the CPU 40 of the PC 6 automatically reads out the serial number 63 from the USB dongle 70 connected to the USB terminal 43. As shown in FIG. 5B, the serial number 63 (data surrounded by thick line in the figure) read out from the USB dongle 70 at step S2 is recorded into the PC 6. With the operation of step S2, the PC 6 acquires apparatus identification information (serial number 63) identifying a license managing storage device that will become a recording (storage) destination of an access key to be generated.

At next step S3, the CPU 40 of the PC 6 transmits, as a set of mutually-associated information, the product ID 66 acquired at step S1 and the serial number 63 acquired at step S2 to the access key issuing site 72 via the Internet 7. Alternatively, at step S3, the application identification information (application name), which is a part of the product ID 66, may be extracted from the product ID 66 and a set of information comprising the extracted application name and the serial number 63 may be transmitted to the access key issuing site 72, instead of the product ID 66 itself being transmitted to the access key issuing site 72 as noted above. As another alternative, data based on the extracted application name may be newly generated, and a set of information comprising the thus-generated data and serial number 66 may be transmitted to the access key issuing site 72. For example, the data to be newly generated may be a combination of the application name and some other data, such as a user's name. In any case, it is essential to transmit a set of the application name and serial number 63 to the access key issuing site 72.

<Issuance of Access Key>

The access key issuing site 72 is a Web site on the Internet which issues an access key 67 to be used for license management of an application package sold by the package selling site 71. At step S4, the access key issuing site 72 receives the information (i.e., the set of the product ID 66 and serial number 63) transmitted from the PC 6 at step S3 above. Thus, as shown in FIG. 5C, the product ID 66 and serial number 63 (i.e., data surrounded by thick line in the figure) transmitted from the PC 6 is recorded into the access key issuing site 72 as a set of information.

Then, at step S5, the access key issuing site 72 generates an access key 67 on the basis of the application identification information (application name) that is a part of the product ID 66 received at step S4 and the serial number 63 (apparatus identification information) of the USB dongle 70 that will become a recording destination of the access key. The generated access key 67 is data comprising the application identification information, identifying the corresponding application program, and the serial number 63, and this access key 67 is used to permit or authorize activation of the application program identified by the application identification information. Then, at step S6, the access key issuing site 72 transmits the access key 67, generated at step S5, to the PC 6. Steps S4 to S6 are directed to operations performed by a CPU of a server computer providing the access key issuing site 72.

<Data Write to the USB Dongle>

At step S7, the CPU 40 of the PC 6 receives the access key 67 transmitted from the access key issuing site 72 at step S6 above. Namely, the operations of steps S4 to S7 function as an access key information acquisition means for acquiring the access key 67 (for authorizing execution (full activation) of the application identified by the application identification information) generated on the basis of the application identification information (application name) and apparatus identification information (serial number 63). FIG. 5D shows a manner in which the access key 67 is created in the access key issuing site 72 on the basis of the serial number 63 and part of the product ID 66 (application name) and then the created access key 67 is recorded into the memory 41. At this stage, as shown in FIG. 5D, the received access key 67 and various data used for generation of the access key 67 (in the instant embodiment, the serial number 63, product ID 66 and application program 65) are recorded into the memory 41 of the PC 6.

At step S8, the CPU 40 of the PC 6 identifies the application program 65 and product ID 66 corresponding to the part of the product ID (application name) used for creation of the access key 67, and then extracts the thus-identified application program 65 and product ID 66. Such an operation of step S8 functions as an application program acquisition means for acquiring the application program identified by the application identification information. In the instant embodiment, even when the application program 65 could not be successfully extracted, control proceeds to step S9 as long as at least the product ID 66 corresponding to the access key 67 could be extracted.

If the product ID 66 could not been successfully extracted at step S8 above, information to that effect is displayed on the display section 44 of the PC 6, after which the data write process is brought to an end. In this case, an operation of next step S9 for writing data into the USB dongle is not performed, and the data write process is terminated after deleting all of the data prepared in the PC 6 (i.e. access key 67, product ID 66, application program 65 and serial number 63) and all of the data present in the access key issuing site 72 (access key 67, serial number 63 and product ID 66).

At step S9, the CPU 40 of the PC 6 extracts the USB dongle 70 identified by the serial number 63 (USB dongle identification information) used for generation of the received access key 67, and, if the USB dongle 70 having the serial number 63 has been extracted (i.e., if the CPU 40 of the PC 6 has such a USB dongle 70 connected thereto), it writes, as a set of mutually associated information 64, the access key 67, received at step S7, and the product ID 66 and application program 65, identified at step S8, into the extracted USB dongle 70. The operation of step S9 functions as a recording means that records, into the license managing storage device, the access key information and application program in association therewith.

Thus, as shown in FIG. 5E, the information set 64 comprising the application program 65, product ID 66 and access key 67 (indicated by thick line in FIG. 5E) is recorded into the USB dongle 70. Further, if the application program 65 corresponding to the access key 67 could not be extracted at step S8, then only the access key 67 and product ID 66 are written into the USB dongle 70 at step S9. Namely, in the instant embodiment, only the product ID 66 is essential as data to be written into the USB dongle 70 together with the access key 67, and the application program 65 is not essential as the data to be written into the USB dongle 70.

Upon completion of the data writing to the USB dongle 70 at step S9, the CPU 40 of the PC 6 terminates the data write process after deleting all of the data prepared in the PC 6 (i.e. access key 67, product ID 66, application program 65 and serial number 63) for the access key issuance and data write process. Also, all of the data prepared in the access key issuing site 72 (access key 67, serial number 63 and product ID 66) are deleted as the data write process is terminated.

If the USB dongle 70 identified by the serial number 63 (USB dongle identification information) used for generation of the received access key 67 could not be extracted at step S9 above, i.e. if the CPU 40 of the PC 6 has the USB dongle 70, corresponding to the serial number 63, connected thereto, the CPU 40 of the PC 6 terminates the data write process after deleting all of the data recorded in the PC 6 for the current access key generation (i.e. access key 67, product ID 66, application program 65 and serial number 63). Also, all of the data recorded in the access key issuing site 72 (access key 67, serial number 63 and product ID 66) may be deleted as the data write process is terminated. Note that, if the CPU 40 of the PC 6 has the USB dongle 70, corresponding to the serial number 63, connected thereto, only the product ID 66 may be left undeleted instead of all of the data being deleted.

<Modification of Data Writing Condition>

The operations of steps S8 and S9 have been described above in relation to the case where only the product ID 66 is essential as the data to be written into the USB dongle 70. Alternatively, not only the product ID 66 but also the application program 65 may be made essential as the data to be written into the USB dongle 70. In such a case, the CPU 40 of the PC 6 performs, at step S8, an operation for extracting the product ID 66 corresponding to the part (application name) of the product ID used for generation of the access key 67 and an operation for extracting the application program 65 corresponding to the part (application name) of the product ID used for generation of the access key 67. If both of the application program 65 and product ID 66 could be extracted at step S8, then the CPU 40 of the PC 6 records, into the USB dongle 70, not only the access key 67 but also the extracted application program 65 and product ID 66 as a set of mutually associated information 64. If any one of the application program 65 and product ID 66 could not be extracted, information to that effect is displayed on the display section 44 of the PC 6, and the CPU 40 of the PC 6 terminates the data write process after deleting all of the data recorded in the PC 6 (i.e. access key 67, product ID 66, application program 65 and serial number 63) and all of the data recorded in the access key issuing site 72 (i.e., access key 67, serial number 63 and product ID 66), without writing any data into the USB dongle.

<Recording Range of Access Key, Etc.>

When an access key 67 is generated using the apparatus identification information (serial number 63) identifying the USB dongle 70 that is a recording destination of the access key 67 and then the thus-generated access key 67 is written into the USB dongle 70, the USB dongle 70 is identified on the basis of the access key 67. Thus, a recording range of the access key 67 (i.e., original access key received from the access key issuing site 72) can be limited only to the USB dongle 70 corresponding to the serial number 63 used for generation of the access key 67.

Further, in the instant embodiment, the original access key 67 recorded in the USB dongle 70 is deleted only when the user intends to delete it, and it is never deleted when a power supply to the system or system component apparatus has been turned off or the application has been deactivated. "when the user intends to delete it" is, for example, when the user has requested the access key issuing site 72 to delete the access key 67. For example, when the user wants to acquire another access key to the application for which the user has already acquired the access key 67, the user may request the access key issuing site 72 to delete the existing (already acquired) access key 67. In response to such a user's request, the access key issuing site 72 deletes the access key 67 recorded in the USB dongle 70.

Further, it is desirable that the access key 67 be recorded in a secure region of the USB dongle 70. For example, the USB dongle 70 may be configured to have two types of storage regions: a secret region whose stored content cannot be viewed by the user; and a non-secret region (i.e., ordinary region) whose stored content can be viewed by the user, so that information having a high confidentiality (e.g., access key 67 and product ID 66) is recorded in the secret region while information having a relatively low confidentiality (e.g., application program 65) is recorded in the non-secret region (ordinary region). Further, data recorded in the USB dongle 70 may be protected so that the data cannot be referenced by the user. Particularly, the information of a high confidentiality recorded in the secret region, especially the access key 67, is highly necessary to be protected. Such data protection may be implemented in any desired one of the conventionally-known manners.

With the above-described access key issuance and data write process, the PC 6 functioning as a data write device can acquire the application identification information (i.e., part of the product ID 66) identifying the application to be license-managed and the apparatus identification information (i.e., serial number 63) identifying the license managing storage device (USB dongle 70), and acquire the access key 67 generated on the basis of the acquired apparatus identification information and application identification information. After acquisition of the access key 67, the application program 65 is identified on the basis of the application identification information used for generation of the access key 67, and the thus-identified application program 65 and the access key 67 can be recorded into the license managing storage device (i.e., USB dongle 70) in association with each other.

In the aforementioned manner, an information set 64, where an application program 65 and product ID 66 constituting one application package and an access key 67 are associated with each other, can be recorded into the USB dongle 70 per application package. Thus, it is possible to simplify license management work, such as association (interconnection) and rearrangement between the application program 65 and the access key 67. Further, because the application program 65 and the access key 67 are recorded in the USB dongle 70 in association with each other, data rearrangement and license management would not require much time and labor even where a plurality of application programs 65 and access keys 67 are present. Further, even in a case where the access key information and the application program are acquired through different acquisition routes, such as where the application program 65 is acquired from a CD-ROM while the access key 67 is acquired via the Internet, the license management work would not require much time and labor. Thus, the instant embodiment can advantageously facilitate additional recording of an application program and allows the access key 67 to be acquired under a secure environment, such as via the Internet.

Each application program 65 is a program created by combining, in a single package, a plurality of types of programs necessary for a plurality of types of apparatus constituting the mixing system, and one access key 67 is issued for that package. In this respect too, the license management can be simplified. Namely, with the aforementioned access key issuance and data write process, the instant embodiment allows the access key (license) 67 to be acquired under a secure environment via the Internet and maintained appropriately, and thus, it allows the license management work of the application program 65, corresponding to the access key 67, to be performed in an easy-to-understand manner and without requiring much time and labor.

Whereas the instant embodiment has been described above in relation to the case where the PC 6, which is a system component apparatus other than the audio signal processing apparatus (i.e., non-audio-signal-processing system component apparatus), functions as a data write apparatus, the present invention is not so limited, and any of the audio signal processing apparatus 1-3 (typically, the console 1) may function as a data write apparatus. In this case, the audio signal processing apparatus 1-3 (typically, the console 1) functioning as a data write apparatus is connected to the Internet 7 and performs the data write process of FIG. 6 with the USB dongle 70 connected to its USB terminal.

<Installation of Application Program>

Figure 7:
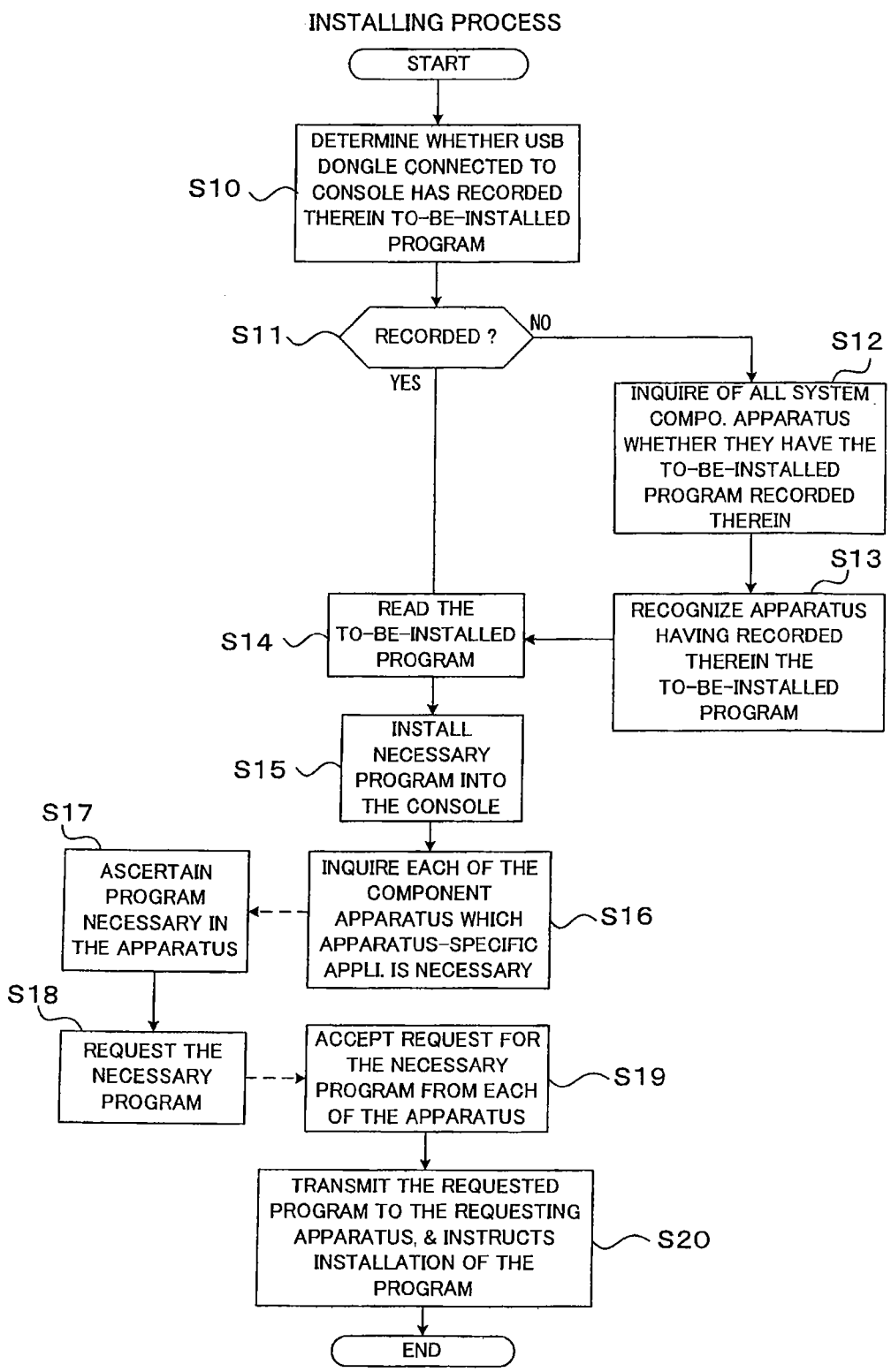
FIG. 7 is a flow chart explanatory of a process for installing an application program, recorded in the USB dongle, into the mixing system.

FIG. 7 is a flow chart explanatory of a process for installing an application program 65, recorded in the USB dongle 70, into the mixing system. This installing process is performed in an apparatus (typically, console 1 or PC 6) having accepted an installation executing instruction given by the user. The following description will be given in relation to the case where such an installation executing instruction has been given via the console 1 (i.e., where the console 1 functions as an installing apparatus). Note that no access key 67 is used in the installing process described below.

Namely, the user inputs an installation executing instruction using a user interface of the console 1. For example, the CPU 10 of the console 1 displays, on the panel display section 17, an installation executing screen showing a listing of all application programs recorded in the USB dongle 70, and accepts the installation executing instruction given or input by the user. Namely, the user can select an application program to be installed from the list shown on the installation executing screen, and input an installation executing instruction for the selected application program 65.

At step S10, the CPU 10 of the console 1 determines whether the USB dongle 70 connected to the USB terminal 13 of the console 1 has recorded therein the application program 65 selected or designated by the user as an object of installation. At this step S10, only the USB dongle 70 directly connected to the USB terminal 13 of the console 1 is searched for the designated application program 65.

If the USB terminal 13 of the console 1 has the USB dongle 70 connected thereto and if the application program 65 designated as an object of installation (i.e., to-be-installed application program 65) is recorded in the USB dongle 70 (YES determination at step S11), control proceeds to step S14. If, on the other hand, the USB terminal 13 of the console 1 does not have the USB dongle 70 connected thereto, or if the to-be-installed application program 65 is not recorded in the USB dongle 70 (NO determination at step S11), control branches to step S12.

At step S12, the CPU 10 of the console 1 inquires all of the other apparatus, constituting the mixing system which the console 1 belongs to, whether or not the to-be-installed application program 65 is recorded in respective USB dongles 70 connected to the other apparatus, and waits for replies to the inquiry from the other apparatus. Namely, such an inquiry is sent to all of the system component apparatus constituting the mixing system, i.e. a plurality of AN-connected audio signal processing apparatus (console 1, engine 2 and I/O 3) and the non-audio-signal-processing system component apparatus (PC 6) CN-connected to the audio signal processing apparatus.

In response to the inquiry sent at step S12, the other apparatus, belonging to the same mixing system as the console 1, each determines whether or not the to-be-installed application program 65 is recorded in the USB dongle 70 connected to its USB terminal. Then, each of the apparatus having detected the to-be-installed application program 65 returns a reply to that effect. Each of the apparatus having no USB dongle 70 connected thereto and each of the apparatus where the to-be-installed application program 65 is not recorded in the USB dongle 70 connected thereto need not reply to the inquiry.

Upon receipt of the reply from the apparatus having detected the to-be-installed application program 65, the CPU 10 of the console 1 recognizes the apparatus, having returned the reply, as a source from which to read the to-be-installed application program 65 (i.e., read source of the to-be-installed application program 65), at step S13. Then, at step S14, the CPU 10 of the console 1 reads out the to-be-installed application program 65 from the USB dongle 70 connected to the USB terminal 13 of the console 1, or from the USB dongle 13 connected to the USB terminal 13 of the apparatus recognized as the read source at step S13 above.

With the operations at steps S10 to S14, the console 1, functioning as an installing apparatus, searches through all of the system component apparatus (i.e., all of the audio signal processing apparatus and non-audio-signal-processing system component apparatus), constituting the mixing system which the console 1 belongs to, to detect any USB dongle 70 having recorded therein the application program 65 designated as an object of installation. Thus, the console 1 can read out the to-be-installed application program 65 from the thus-found USB dongle (i.e., license managing storage device) 70. That the USB dongle 70 has recorded therein the to-be-installed application program 65 means that the USB dongle 70 has already been subjected to the access key issuance and data write process described above in relation to FIG. 6. Thus, it may be said that the CPU 10 of the console 1 reads out the to-be-installed application program 65 from the USB dongle 70 having recorded therein an information set 64 comprising the to-be-installed application program 65 and the access key 67 associated with each other.

If no reply to the inquiry made at step S12 has been returned from any of the apparatus, i.e. if no USB dongle 70 having recorded therein the to-be-installed application program 65 is connected to any of the apparatus constituting the mixing system, the CPU 10 of the console 1 terminates the installing process of FIG. 7.

At step S15, the CPU 10 of the console 1 executes an installer contained in the to-be-installed application program 65 read out at step S14 above, to install a necessary application into the console 1. Thus, of the to-be-installed application program 65, the necessary application (e.g., screen displaying GUI program) in the console 1 is written into the memory 11 of the console 1, so that the GUI program can be placed in a state executable in the console 1.

At following step S16, the CPU 10 of the console 1 inquires each of the other system component apparatus, constituting the mixing system, which apparatus-specific application of the to-be-installed application program 65 is necessary in the system component apparatus. The "application of the to-be-installed application program 65" necessary in the system component apparatus is an apparatus-specific application program, such as the screen displaying GUI program for the console 1 or microprograms for the DSP section 27 of the engine 2.

In response to the inquiry received from the CPU 10 of the console 1, the CPU of each of the system component apparatus ascertains an apparatus-specific application program necessary in the apparatus at step S17, and then the apparatus requests the console 1 for the necessary apparatus-specific application program at step S18. The apparatus-specific application program requested to the console 1 is an application program of the to-be-installed application program 65 which is necessary in the requesting apparatus and which has not yet been installed in the requesting apparatus. Therefore, each apparatus where the necessary apparatus-specific application program has already been installed or each apparatus where no apparatus-specific application program is necessary (e.g., I/O apparatus 3) does not transmit to the console 1 a request for an apparatus-specific application program.

At step S19, the CPU 10 of the console 1 receives each application program request transmitted from the system component apparatus at step S18 above. With the operations of steps S15 to S19, the console 1 functioning as the installing apparatus can extract, from among all of the system component apparatus constituting the mixing system which the console 1 belongs to, each apparatus requiring installation of the application program and identify the apparatus-specific application program for each of the extracted apparatus.

Then, per each of the requests received at step S19, the CPU 10 of the console 1 takes out the apparatus-specific application program, corresponding to the request, from the to-be-installed application program 65 read out at step S14 above. At next step S20, the CPU 10 of the console 1 transmits the thus-taken-out apparatus-specific application program of the to-be-installed application program 65 to the corresponding system component apparatus, but also instructs each of the system component apparatus to install the apparatus-specific application program.

Then, the system component apparatus having received the apparatus-specific application programs install the received apparatus-specific application programs. For example, the console 1 takes out, from the to-be-installed application program 65, the microprograms for the DSP section 27 to transmit the read-out microprograms to the engine 2, and it also takes out, from the to-be-installed application program 65, the GUI program to transmit the read-out GUI program to the PC 6. The CPU 20 of the engine 2 writes the microprograms, received from the console 1, into the memory 21 so that the microprograms are made executable in the DSP section 27. Further, the CPU 40 of the PC 6 writes the GUI program, received from the console 1, into the memory 41 so that the GUI program is made executable in the DSP section 27. In the aforementioned manner, the necessary apparatus-specific application programs are installed into the individual system component apparatus, but these application programs are not executed at this stage.

Through the above-described installing process of FIG. 7, the console 1 functioning as the installing apparatus reads out the to-be-installed application program from the USB dongle (license managing storage device) 70 and searches through all of the system component apparatus of the mixing apparatus to identify system component apparatus which requires installation of the program and apparatus-specific application programs corresponding to the types of the system component apparatus. Then, the console 1 transmits, to each of the identified system component apparatus, the apparatus-specific application program corresponding to the type of the apparatus and instructs each of the identified system component apparatus to install the corresponding transmitted apparatus-specific application program.

Thus, the necessary apparatus-specific application programs can be collectively installed into all of the requesting system component apparatus (i.e., all of the audio signal processing apparatus and non-audio-signal-processing system component apparatus), constituting the mixing system which the console 1 belongs to. Thus, in the mixing system, operations for additionally installing application programs into the individual system component apparatus can be performed with ease. Further, the USB dongle 70 having recorded therein the to-be-installed application program 65 is searched for through all of the system component apparatus constituting the mixing system. Thus, as long as the USB dongle 70 is connected to the USB terminal 13 of the console functioning as the installing apparatus, or the USB dongle 70 is present somewhere in the mixing system, it is possible to read out the to-be-installed application program 65 from the USB dongle 70 extracted through the search and install the read-out application into each of the requesting apparatus. Further, because the access key 67 to be used for execution (full activation) of the installed to-be-installed application program 65 is stored in the USB dongle 70 in association with the program 65, a process for authenticating the execution (full activation) of the application program 65 using the access key 67 can be performed smoothly without requiring much time and labor for finding a stored location of the access key 67 and the like. Namely, in the audio signal processing system comprising a plurality of system component apparatus including a plurality of audio signal control apparatus, it is possible to not only appropriately perform license management (unauthorized use prevention) of the application program, but also readily perform operations for additionally introducing an application program.

The installing process has been described above in relation to the construction where the application recorded in the USB dongle 70 is installed, and in relation to the state after completion of the access key issuance and data write process of FIG. 6 (i.e., on the assumption that the access key 67 and application program 65 have already been recorded in the USB dongle 70). However, because the installing process does not use the access key, the application program may be installed into the mixing system before the access key issuance and data write process are performed after purchase of the application package.

<Application Setting Screen>

Figure 8:
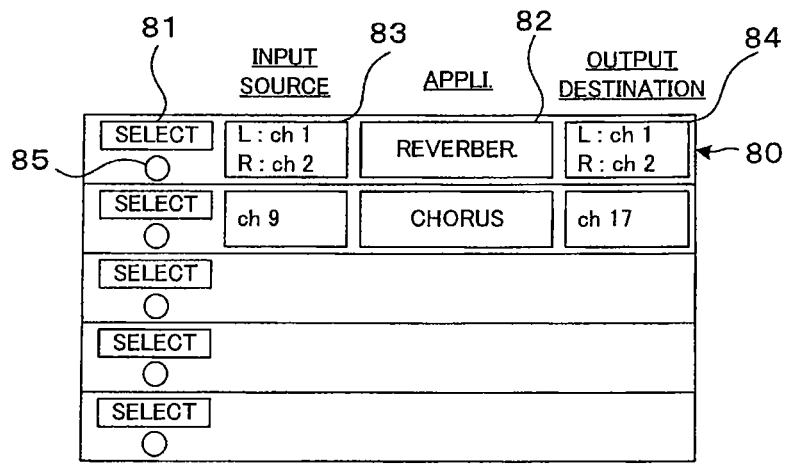
FIG. 8 is a diagram showing an application setting screen.

FIG. 8 shows an application setting screen for the user to perform various setting operations for the application installed through the installing process shown in FIG. 7. Here, it is assumed that the application setting screen is displayed on the panel display section 17 of the console 1 and various setting operations for the application are performed using a user interface of the console 1.

In FIG. 8, the application setting screen includes a plurality of virtual rack sections 80, to each of which can be allocated one application. In each of the virtual rack sections 80, an application selecting virtual switch 81 is a switch image for selecting one application to be allocated to the rack section 80; this application selecting virtual switch 81 will hereinafter be referred to simply as "selection switch 81". In response to user's operation of the selection switch 81, the CPU 10 of the console 1 displays, on the panel display section 17, a listing of applications (application names) currently installed in the console 1, to thereby prompt the user to select one application. The user can select one desired application from the displayed listing of applications and allocate the selected application to the rack section 80 in question. It is assumed here that the user selects an application for adding an effecter function (i.e., plug-in EF 60 of FIG. 2).

Further, in each of the virtual rack sections 80, an application display section 82 is a region where is displayed the name of the application selected by the user. In the illustrated example of FIG. 8, an application having a "reverberation" function is allocated to the uppermost rack section 80, and an application having a "chorus" function is allocated to the second uppermost rack section 80. An input source setting section 83 is a region for setting an input source of an audio signal to be input to the selected application (effecter), and information indicating currently-set input source (e.g., channel No.) is displayed in this region. An output destination setting section 84 is a region for setting an output destination of an audio signal output from the selected application (effecter), and information indicating a currently-set output destination (e.g., channel No.) is displayed in this region.

<Temporary Activation of Application>

The above-mentioned selection switch 81 functions as a temporary activation instruction section for instructing "temporary activation of the application". Here, "temporary activation of the application" is an activation state capable of accepting parameter setting operation related to the application with predetermined protection applied to execution (full activation) of the application. Once temporary activation of the application is instructed, the CPU 10 of the console 1 invalidates audio signal processing (effect processing), based on microprograms related to the application, by setting at least a "bypass parameter" of the DSP section 27 of the engine 2 to an ON state, and thereby applies predetermined protection to execution (full activation) of the application. This is operation of an invalidation means or section implemented by the CPU 10 of the console 1. Here, the "predetermined protection" means preventing the user from using a result of the signal processing based on the application. A state where the above-mentioned protection is removed from the "temporary activation" is called "full activation" of the application. In the memory 11 of the console 1 is prepared data indicative of a current activation state of the application (i.e., data indicating whether the application is currently in the temporary activation state or in the full activation state). In response to a temporary activation instruction or full activation instruction, the CPU 10 of the console 1 rewrites the data indicative of the current activation state of the application or reference the data indicative of the current activation state of the application as necessary.

By operating the selection switch 81 to select one application, the user instructs temporary activation of the selected application. Once temporary activation of the application is instructed, the CPU 10 of the console 1 sets data indicative of "currently in the temporary activation state" as the data indicative of the current activation state of the application, and it allocates resources, necessary for parameter editing, to the application (GUI program) of which the temporary activation has been instructed. This is part of operation of a temporary activation start section implemented by the CPU 10 of the console 1. For example, the CPU 10 of the console 1 secures a region in the current buffer area of the memory 11 for recording therein a group of parameters related to the application, and it sets values of various parameters of the application in that region. Thus, a parameter editing function (editor) of the application of which the temporary activation has been instructed is made usable in the console 1, and the console 1 is placed in a state capable of accepting various parameter setting operation related to the application.

Further, in response to the temporary activation instruction of the application, the CPU 10 of the console 1 reflects the stored content of the current buffer area, where the values of the various parameters of the temporarily-activated application have been additionally set, in the engine 2. This is part of operation of the temporary activation start section implemented by the CPU 10 of the console 1. The engine 2 sets the settings, stored in the current buffer area, into the audio signal processing section (DSP section 27) and starts the audio signal processing (effect processing). However, at the temporary activation stage, predetermined protection is applied to the audio signal processing (effect processing) of the application.

Figure 9:
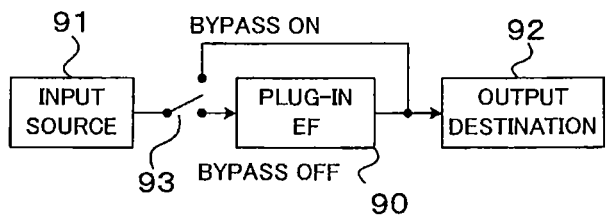
FIG. 9 is a block diagram explanatory of a configuration of effect signal processing performed in a DSP section.

FIG. 9 is a block diagram explanatory of a configuration of the audio signal processing (effect processing) performed in the audio signal processing section (DSP section 27) on the basis of the microprograms of the application. In FIG. 9, an input source 91 and output destination 92 represent an input source and output destination of an audio signal set via the input source setting section 83 and output destination setting section 84 of the application setting screen of FIG. 8. The plug-in EF 90 performs the audio signal processing (effect processing) on an audio signal, input from the input source 91, on the basis of the microprograms of the application selected by user's operation of the selection switch 81. Values of parameters for the effect processing correspond to values of various parameters set in the current buffer area of the memory 11. A bypass parameter 93 is a parameter for selecting any one of an ordinary path for supplying the audio signal, input from the input source 91, to the plug-in EF 90 and a bypass path for supplying the input audio signal to the output destination 92 with the plug-in EF 90 bypassed.

Namely, when the bypass parameter 93 is ON, the bypass path is selected, but when the bypass parameter 93 is OFF, the ordinary path is selected. More specifically, when the bypass parameter 93 is ON, the audio signal, input from the input source 91, passes through the bypass path (i.e., bypasses the plug-in EF 90), so that the audio signal having not been subjected to the effect processing of the application (i.e., the same signal as input from the input source 91) is output via the output destination 92. When the bypass parameter 93 is OFF, on the other hand, the audio signal, input from the input source 91, is supplied to the plug-in EF 90, so that the audio signal having been subjected to the effect processing is output via the output destination 92.

In summary, a bypass section comprises a switching element controlled by the bypass parameter 93, the bypass path and the ordinary path passing through the plug-in EF 90. When the bypass parameter 93 is OFF, the bypass section causes the DSP section (audio signal processing section) 27 to perform the signal processing, through the plug-in EF 90, on the audio signal input via the input source (input section) 91 and outputs the audio signal, having been subjected to the signal processing, via the output destination (output section) 92. On the other hand, when the bypass parameter is ON, the bypass section outputs the audio signal, input via the input source (input section) 91, via the output destination (output section) 92 without causing the DSP section (audio signal processing section) 27 to perform the signal processing on the input audio signal.

In response to a temporary activation instruction of the application, the CPU 10 of the console 1 sets values of various parameters of the application into the current buffer area secured for the application, at which time it automatically sets the bypass parameter of the various parameters to an ON state. This is also part of operation of the temporary activation start section implemented by the CPU 10 of the console 1. Because, as noted above, the stored content of the current buffer area of the memory 11 is reflected in the engine 2 in response to the temporary activation instruction of the application, the bypass parameter 93 of the application is set to ON in the DSP section 27 during the temporary activation. Consequently, there will be output an audio signal having not been subjected to the effect processing by the plug-in EF 90, and thus, the audio signal processing based on the application program is prevented from being started substantively.

In summary, the temporary activation start section which, when the temporary activation instruction has been accepted by the temporary activation instruction section (switch 81), starts, for the application program of which the temporary activation has been instructed, the signal processing by the signal processing section (DSP section 27) and acceptance, by the parameter editing section, of parameter change operation, but also sets data indicative of the activation state of the application program, of which the temporary activation has been instructed, to "currently in a temporary activation state" and sets the bypass parameter of the application program to ON <Editing of Parameters of Application>

The temporary activation of the application allows the console 1 (system control apparatus) to accept editing operation of all parameters other than the bypass parameter. Once operation is performed on the application setting screen of FIG. 8 for selecting an application allocated to any one of the rack sections 80 (e.g., operation of clicking the application display section 82 of the rack section 80), the CPU 10 of the console 1 displays, on the panel display section 17, an editing screen, separately from the application setting screen, for editing parameters of the selected application. Thus, the user can edit various parameters of the selected application on the editing screen.

Figure 10:
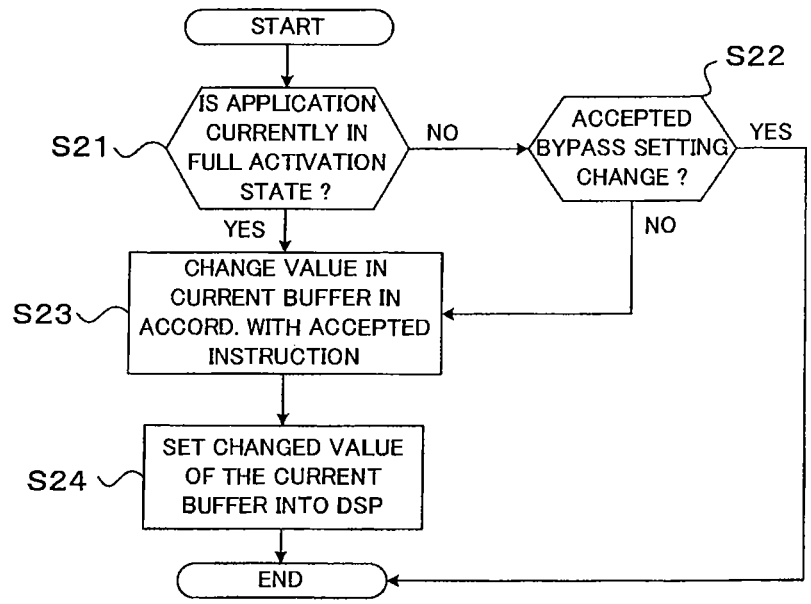
FIG. 10 is a flow chart explanatory of a parameter setting change process.

FIG. 10 is a flow chart explanatory of a parameter setting change process performed by the CPU 10 of the console 1. This parameter setting change process is started up when the user has given an instruction for editing (or changing) a setting (value) of a parameter on the editing screen.

<In the Case of Temporary Activation>

The CPU 10 of the console 1 checks a current value of the data indicative of the current activation state of the application to determine, at step S21, whether the application is currently in the "full activation" state. If the data indicative of the current activation state of the application indicates that the application is currently in the "temporary activation" state (NO determination at step S21), the CPU 10 of the console 1 further determines whether the parameter to be edited is the bypass parameter. If the parameter to be edited is other than the bypass parameter (NO determination at step S22), the CPU 10 of the console 1 changes a setting (value) of the parameter, stored in the current buffer area, on the basis of an instruction input by the user (step S23), but also sets the changed setting of the parameter into the DSP section 27 of the engine 2 (step S24). In this manner, the setting of the parameter (other than the bypass parameter) is changed in accordance with the parameter editing instruction given via the editing screen.

If the parameter to be edited is the bypass parameter (YES determination at step S22), the CPU 10 of the console 1 terminates the parameter setting change process without accepting a user's instruction for changing the bypass parameter. Namely, during the temporary activation, the bypass parameter is inhibited from being changed, so that the bypass parameter is kept at the ON setting during the temporary activation. Note that, during the temporary activation, the bypass parameter is inhibited from being changed in response to any parameter editing instructions, including a bypass parameter editing instruction, so as to keep the bypass ON state (i.e., bypass activated state) during the temporary activation. It is only when the full activation of the application has been started that the bypass parameter set during the temporary activation can be changed to the OFF setting.

In summary, with the operation at step S21, the CPU 10 of the console 1 functions as a determination section which, when operation for changing a value of a parameter has been accepted by the parameter editing section, determines whether the data indicative of the activation state of the application program indicates "currently in a temporary activation state" or "currently in a full activation state"; and with the operations at steps S22 and S23 after YES determination at step S22, the CPU 10 of the console 1 functions as a temporary activation editing section which, when the determination section has determined that the data indicative of the activation state of the application program indicates "currently in a temporary activation state", does not change the value of the parameter to be edited if the parameter to edited is the bypass parameter, but changes the value of the parameter to be edited on the basis of the operation accepted by the parameter editing section if the parameter to be edited is not the bypass parameter.

<In the Case of Full Activation>

If the data indicative of the current activation state of the application indicates that the application is currently in the "full activation" state (YES determination at step S21), the CPU 10 of the console 1 accepts editing operation of all parameters including the bypass parameter. Namely, irrespective of the type of the parameter to be edited, the CPU 10 of the console 1 changes, at step S23, the setting of the parameter stored in the current buffer area of the memory 11 and sets the changed setting of the parameter into the DSP section 27 of the engine 2. In this manner, the setting of the parameter is changed in response to the parameter editing instruction given via the editing screen.

In summary, with the operation at step S23 after YES determination at step S21, the CPU 10 of the console 1 functions as a full activation editing section which, when the determination section has determined that the data indicative of the activation state of the application program indicates "currently in a full activation state", changes the value of the parameter on the basis of the operation accepted by the parameter editing section irrespective of a type of the parameter to be edited.

Because the instant embodiment permits "temporary activation of the application" as noted above, it can permit the user to edit various types of parameters (other than the bypass parameter) while preventing unauthorized use of the application program with predetermined protection applied such that the actual audio signal processing (effect processing) based on the application program may not be started prior to due authentication, with the access key 67, of the application (i.e., prior to the later-described full activation). Thus, the instant embodiment permits preparatory work, such as operation for setting parameters of the application, even when no USB dongle 70 is connected to any of the system component apparatus within the mixing system, prior to the full activation of the application, or before the access key of the application is acquired (i.e., before the access key issuance of FIG. 6 is effected); thus, it is possible to achieve an enhanced efficiency of the parameter setting operation of the application.

Further, in the instant embodiment, the bypass parameter is set to and kept at the ON setting in both of the current buffer area of the memory 11 and the DSP section 27 during the temporary activation of the application. However, because the audio signal processing is not substantively started during the temporary activation, the instant embodiment may be constructed such that the bypass parameter is set to and kept at the ON setting only in the DSP section 27 during the temporary activation.

In the case where the instant embodiment is constructed such that the bypass parameter is set to and kept at the ON setting only in the DSP section 27 during the temporary activation, the current buffer area of the memory 11 may be controlled to accept a change of the bypass parameter but to not reflect the change of the bypass parameter in the DSP section 27, as a modification of the parameter editing process of FIG. 10. Namely, once editing of a parameter is instructed on the editing screen during the temporary activation of the application, the CPU 10 of the console 1 changes the setting of the to-be-edited parameter on the basis of the instruction input by the user and then determines whether or not the to-be-edited parameter is the bypass parameter. If the parameter to be edited is other than the bypass parameter, the CPU 10 of the console 1 sets the changed setting of the parameter into the DSP section 27 of the engine 2. If, on the other hand, the parameter to be edited is the bypass parameter, the CPU 10 of the console 1 keeps, at the ON setting, the bypass parameter stored in the DSP section 27 of the engine 2.

<Full Activation of Application>

On the application setting screen of FIG. 8, a full activation instructing virtual switch 85 is a switch image for instructing full activation of an application allocated to the corresponding rack section 80 (hereinafter referred to as "full activation instructing switch 85"). The full activation instructing switch 85 is a full activation instructing section. Using the full activation instructing switch 85, the user can instruct full activation of the application allocated to the rack section 80.

Figure 11:
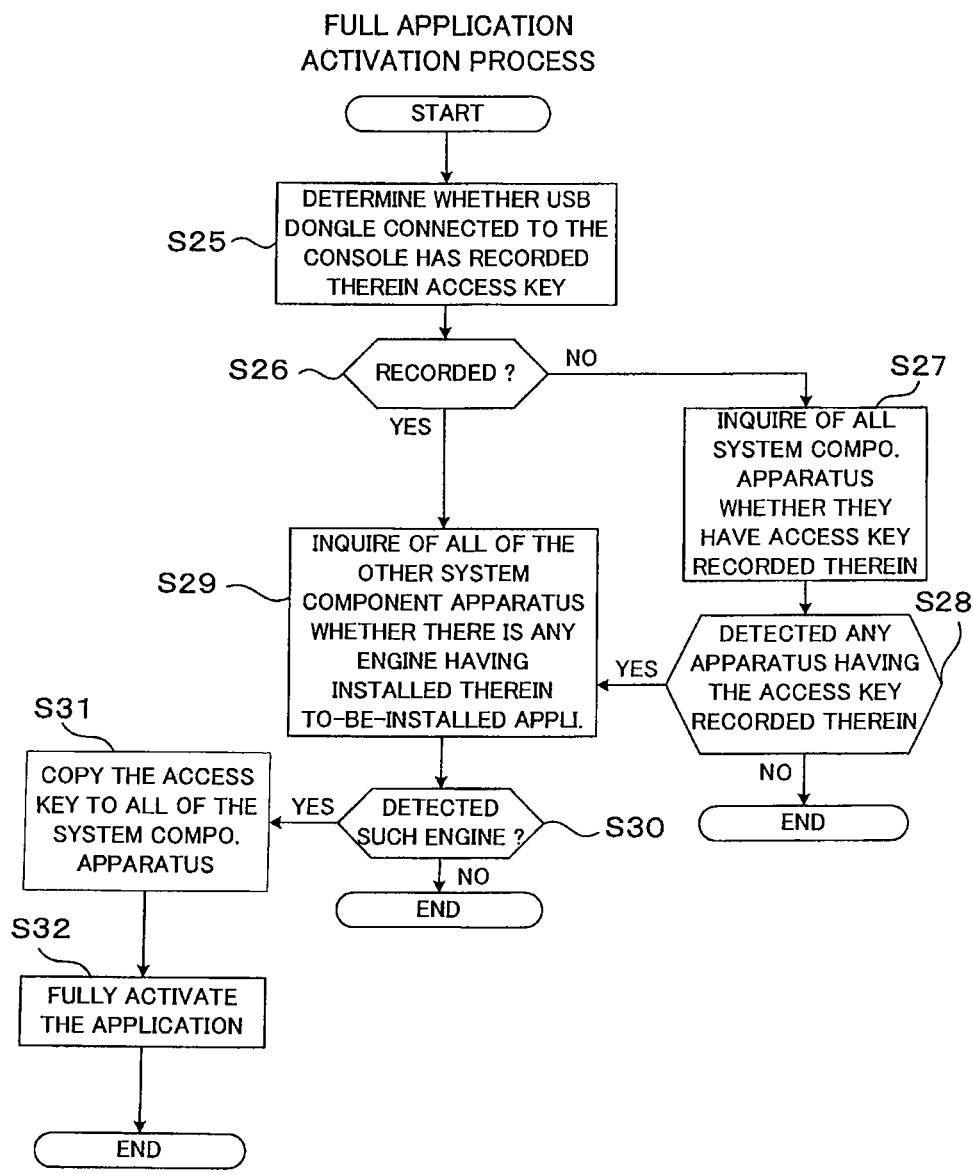
FIG. 11 is a flow chart explanatory of a full application activation process.

FIG. 11 is a flow chart explanatory of a full application activation process. Once an instruction for fully activating an application, given using the full activation instructing switch 85, is accepted, the CPU 10 of the console 1 starts up the full application activation process of FIG. 11 for the application. The component that performs the full application activation process of FIG. 11 is an apparatus having accepted the instruction for fully activating an application and is not necessarily limited to the console 1. Typically, the PC 6 too may become the component that performs the full application activation process. Further, an instruction for fully activating an application may be given in any conventionally-known way without being limited to the aforementioned approach using the full activation instructing switch 85, as long as full activation of the application can be instructed.

Upon acceptance of the instruction for fully activating the application, the CPU 10 of the console 1 ascertains whether the USB dongle 70 connected to the USB terminal 13 of the console 1 has recorded therein the access key 67 corresponding to the application to be fully activated, to thereby authenticate the application with the access key 67 (step S25). Namely, if it has been ascertained that the access key 67 corresponding to the application to be fully activated is currently recorded in the USB dongle 70 connected to the USB terminal 13 of the console 1 (YES determination at step S26), then it means that due authentication has been secured for the application to be fully activated.

Here, the "access key 67 corresponding to the application" means or refers to an access key including the name of the application to be fully activated. Even if the access key 67 recorded in the USB dongle 70 is one issued for another product (i.e., another application package), the application to be fully activated can be authenticated as long as the access key 67 recorded in the USB dongle 70 contains at least the same application name as the application to be fully activated (i.e., as long as the access key 67 recorded in the USB dongle 70 corresponds to the same type of application as the application to be fully activated).

On the other hand, if the access key 67 corresponding to the application to be fully activated is not recorded in the USB dongle 70, or if no USB dongle 70 is connected to the USB terminal 13 of the console 1 (NO determination at step S26), the CPU 10 of the console 1 proceeds to step S27. Note that "if the access key 67 corresponding to the application to be fully activated is not recorded in the USB dongle 70" refers to a situation where the USB dongle 70 has no access key recorded therein or where the access key 67 does not correspond to the application to be fully activated.

At step S27, the CPU 10 of the console 1 inquires of all of the other system component apparatus, constituting the mixing system it belongs to, whether the other component apparatus have recorded therein the access key 67 corresponding to the application to be fully activated, and waits for replies to the inquiry from the other system component apparatus. Namely, like at step S12, the CPU 10 of the console 1 inquires of all of the other system component apparatus of the mixing system which include the plurality of mutually AN-connected audio signal processing apparatus (i.e., console 1, engine 2 and I/O apparatus 3) and the non-audio-signal-processing system component (PC 6) CN-connected to the audio signal processing apparatus.

In response to the inquiry made at step S27 above, each of the other system component apparatus, constituting the mixing system the console 1 belongs to, ascertains whether the USB dongle connected to its USB terminal has recorded therein the access key 67 corresponding to the application to be fully activated. Then, each system component apparatus which has detected the access key 67 corresponding to the application to be fully activated returns a reply to that effect. Note that each system component apparatus which has no USB dongle connected thereto and each system component apparatus which does not have the access key 67, corresponding to the application to be fully activated, recorded in the USB dongle connected thereto, do not return a reply to the inquiry.

By receiving the reply from the system component apparatus having detected the access key 67 corresponding to the application to be fully activated, the CPU 10 of the console 1 can confirm that the access key 67 corresponding to the application to be fully activated is recorded in the USB dongle 70 connected to any one of the apparatus within the mixing system it belongs to (i.e., that it could detect a system component apparatus with the USB dongle 70 connected thereto and having recorded therein the access key 67 corresponding to the application to be fully activated). If the access key 67 corresponding to the application to be fully activated is recorded in the USB dongle 70 (YES determination at step S28), it means that due authentication with the access key 67 has been secured for the to-be-fully-activated application.

In case no reply has been returned from any one of the system component apparatus within a predetermined time period (NO determination at step S28), the CPU 10 of the console 1 determines that authentication has failed and thus terminates the full application activation process. For example, if no USB dongle 70 having recorded therein the access key 67 corresponding to the application to be fully activated is connected to the console 1 or any one of the system component apparatus within the system, there is detected no system component apparatus provided with such a USB dongle 70 having recorded therein the access key 67 corresponding to the application to be fully activated, and thus the authentication will fail. When the process is terminated due to the authentication failure, it is preferable that information indicating that authentication has failed be displayed on the panel display section 17.

In summary, with the operations at steps S25-S27, the CPU 10 of the console 1 functions as an authorization section which. when the full activation instruction of the application program has been accepted by the full activation instruction section (switch 85), confirms presence of the access key corresponding to the application program of which the full activation has been instructed and authorizes the full activation of the application program of which the full activation has been instructed.

At step S29, the CPU 10 of the console 1 inquires all of the other apparatus, constituting the mixing system, whether or not there is any engine 2 having installed therein the application program to be fully activated. Because the full activation of the application means actually starting the audio signal processing (effect processing) based on the application, the full activation of the application cannot be effected if there is no such engine 2, which performs the audio signal processing, within the system. Thus, if there is no such engine 2 within the system (NO determination at step S30), the CPU 10 of the console 1 immediately terminates the full application activation process. Also, if there is an engine 2 within the system but the application program (i.e., microprograms for the DSP section) to be fully activated has not been installed in the engine 2, then the CPU 10 of the console 1 may immediately terminate the full application activation process similarly to the above. Note that, if the application program to be fully activated has not been installed in the engine 2, the full application activation process may be arranged to continue after the to-be-fully-activated application process is installed into the engine 2, instead of being immediately terminated. In such a case, however, if no installer is present in any one of the system components within the mixing system, the full application activation process is terminated because no installation is possible.

Further, if the engine 2 having installed therein the application program to be fully activated has been detected within the mixing system (YES determination at step S30), the CPU 10 of the console 1 goes to step S31, the access key 67 presence of which has been confirmed at step S25 or S28 (i.e., original access key 67 recorded in the USB dongle 70) is copied to the memory of each of the system component apparatus constituting the mixing system.

More specifically, the access key copied to each of the system component apparatus is recorded into the memory of the system component apparatus in a volatile manner and retained in the memory until the entire mixing system or the system component apparatus in question is deactivated (powered off). Namely, when the power supply to the entire mixing system (and hence the power supply to all of the system component apparatus) has been turned off, or when the power supply to any one of the apparatus within the mixing system has been turned off individually, the CPU 10 of the console 1 deletes the copy of the access key recorded in the one or more powered-off system component apparatus. As long as the access key has been authenticated once, effectiveness of the authentication of the application performed using the access key can be continued in each of the system component apparatus using the copy of the access key, unless the power supply is turned off. Note that the copied access key that becomes an object of deletion and the original access key that is not to be deleted can be distinguished from each other on the basis of a difference between data strings constituting the two.

By the copy of the access key being recorded in each of the system component apparatus as noted above, the effectiveness of the authentication of the application can be continued even when the USB dongle 70 having recorded therein the original access key 67 has become no longer present in the mixing system, such as when the USB dongle 70 has been inadvertently disconnected. Because leaving the USB dongle 70 connected to the USB terminal is not preferable from the viewpoint of operation of the mixing system, it is desirable that, once the application is authenticated with the original access key, the USB dongle 70 be disconnected from the USB terminal and the authentication of the application with the original access key be allowed to remain effective even with the USB dongle 70 disconnected.

Further, by the copy of the access key being recorded in each of the system component apparatus as noted above, each of the apparatus can promptly perform authentication of the application with the access key. Thus, in the system control apparatus, such as the console 1 and PC 6, activation of an editor screen (i.e., activation which requires authentication with the access key) can be effected promptly.

The full application activation process has been described as copying the access key to all of the system component apparatus at step S31. However, if there is any system component apparatus, among the system component apparatus constituting the mixing system, in which the application to be fully activated (apparatus-specific application program) has not been installed, the CPU 10 of the console 1 may perform an operation for recording a copy of the access key only to system component apparatus in which the application (apparatus-specific application program) has been installed. As another example, the full application activation process may record a copy of the access key into all of the system component apparatus irrespective of whether or not the application (apparatus-specific application program) has been installed in each of the system component apparatus. As still another example, the full application activation process may record a copy of the access key into all of the system component apparatus after causing the application to be installed into each system component apparatus where the application (apparatus-specific application program) has not yet been installed.

Then, the CPU 10 of the console 1 cancels the invalidation of the audio signal processing—effected earlier by the ON setting of the bypass parameter—by setting the bypass parameter to OFF for the application to be fully activated, so that the application to be fully activated is placed in the fully activated state (step S32). With the operation at step S32, the CPU 10 of the console 1 functions as a full activation start section. Namely, the CPU 10 of the console 1 rewrites or changes the setting of the bypass parameter of the to-be-fully-activated application, stored in the current buffer area of the memory 11, into the OFF setting, but also rewrites or changes the data indicative of the current activation state of the application from "currently in the temporary activation state" into "currently in the full activation state". Then, the CPU 10 of the console 1 reflects the changed setting of the current buffer area in the DSP section 27 of the engine 2. Thus, in the mixing system, the audio signal processing based on the to-be-fully-activated application is started. Thus, in the illustrated example, audio signals having been subjected to the effect processing will be output from the plug-in EF 90. As a consequence, it is possible to actually use the function of the to-be-fully-activated application in the mixing system.

Namely, according to the full application activation process described above in relation to FIG. 11, the CPU 10 of the console 1 functions as a detection section that, at steps S25 and 27, searches through all of the system component apparatus, constituting the audio signal processing system, to detect any system component apparatus provided with a recording section having recorded therein access key information corresponding to an application program to be fully activated. The CPU 10 of the console 1 functions as an authentication control section which authorizes activation of the application program in each of the system component apparatus constituting the audio signal processing system if such a system component apparatus provided with a recording section having recorded therein access key information has been detected by the detection section at steps S26 and 28, but terminates the full application activation process without authenticating activation of the application program if such a system component apparatus has not been detected by the detection section. Then, when the activation of the application program has been authorized at step S32, the CPU 10 of the console 1 functions as a signal processing start control section which causes an audio signal processing apparatus, having a function of performing signal processing on audio signals among the plurality of system component apparatus, to start signal processing based on the application program. As noted above, a search is made for the access key through not only the apparatus that performs the full application activation process but also all of the other apparatus within the mixing system which the activation-process processing apparatus belongs to. Thus, as long as the USB dongle 70 having recorded therein the access key 67 for the to-be fully-activated application is connected to any one of the apparatus within the mixing system (i.e., if the original access key 67 is present somewhere within the mixing system), the to-be fully-activated application program 65 can be authenticated with the access key 67, so that the application program 65 can be fully activated, i.e. activation of the application program 65 can be authorized.

Namely, instead of the authentication, with the access key, of the application being performed individually per each of the system component apparatus constituting the mixing system, one access key 67 recorded in the USB dongle 70 is shared among all of the system component apparatus of the mixing system. Thus, in the embodiment of the mixing system composed of a plurality of system component apparatus including a plurality of audio signal processing apparatus, the application program can be executed (fully activated) with extremely simple operation and with unauthorized use of the application program appropriately prevented.

Further, because there is set no limitation on the number of applications whose full activation is authorized using the access key 67, the full activation of the application can be authorized irrespective of the number of the system component apparatus in the mixing system. For example, even in a system configuration where a plurality of system component apparatus of a same type exist (e.g., system configuration where a plurality of consoles 1 and a plurality of engines 2 exist as in the illustrated example of FIG. 1), full activation of the application can be authorized for all of the system component apparatus. Further, because the range over which full activation of the application is authorized is limited absolutely to within the mixing system which the system component apparatus that has connected thereto the USB dongle 70 having recorded therein the access key 67 belongs to, any apparatus outside the mixing system (i.e., any apparatus belonging to another mixing system different from the above-mentioned mixing system) is not allowed to access the above-mentioned mixing system to use the access key 67 with a view to fully activating the application in the other mixing system.

In an alternative, full activation of the application may be started at step S32 without the access key copy creation operation of step S31 being performed, and re-authentication, with the access key 67, of the application being activated may be performed. In the case where the re-authentication, with the access key 67, of the application is performed, the system control apparatus (console 1 or PC 6) periodically performs the operations of steps S25 to S28 to periodically ascertain whether or not the original access key 67 is present within the mixing system. If it could be ascertained that the original access key 67 is present within the mixing system, the authentication of the application is kept effective, while, if it could not be ascertained that the original access key 67 is present within the mixing system, it is determined that the re-authentication has failed, and the full activation of the application is terminated.

If the application is terminated due to the re-authentication failure, the audio signal processing (effect processing) based on the application is terminated. The termination of the full activation of the application may comprise deleting the microprograms of the to-be-terminated application, loaded in the DSP section 27, to thereby disable the audio signal processing based on the application, or setting the bypass parameter to ON for the to-be-terminated application at least in the DSP section 27 to thereby invalidate the audio signal processing based on the application. Note that the re-authentication operation is used only where the operation of step S31 for creating a copy of the access key 67 is not performed. Where the operation for creating a copy of the access key 67 is performed as in the above-described embodiment, charge-free use of the application is ensured after the application is authenticated, unless the power supply is turned off, and thus, in this case, the re-authentication operation is unnecessary.

<Example Preferred Use of the USB Dongle>

Because the instant embodiment is constructed in such a manner that, as long as a USB dongle 70 having recorded therein an access key 67, corresponding to the application to be fully activated, is connected to any of system component apparatus within a mixing system, full activation of the application (i.e., authentication, with the access key, of the application) can be performed. Thus, success/failure of the full activation of the application (i.e., authentication, with the access key, of the application) does not depend on the mixing system using the application. Therefore, the user is allowed to use an application program 65 in a regular manner in a desired mixing system as long as the user possesses a USB dongle 70 having recorded therein an application package (application program 65 and product ID 66) and access key 67 corresponding to the application.

Further, even in a mixing system where the application program has not been installed, the necessary application (apparatus-specific application programs) can be installed from the USB dongle 70 into the individual system component apparatus within the mixing system. Thus, by the application program 65 and the corresponding access key 67 being recorded in a set in the USB dongle 70, it is possible to simplify a series of operations (i.e., installation and full activation) for adding the application to the system.

Further, because success/failure of the full activation of the application (i.e., authentication, with the access key, of the application) does not depend on the mixing system that uses the application, and because the operations (i.e., installation and full activation) for adding the application to the mixing system can be simplified, the instant embodiment can advantageously enhance a degree of freedom of use of the application. For example, in a mixing system installed in a concert venue or a mixing system taken out as rental equipment, the user may bring a USB dongle 70, having a desired application recorded therein, to an installed location of the mixing system and install the application into the system, so that operations for installing and fully activating the application program 65, thus brought by the user, can be performed with ease. In addition, because the USB dongle 70 employed in the present invention is of a small size and has superior portability, it is suited for applications where the user brings the USB dongle 70 to the installed location of the mixing system and uses the application program 65 in that installed location of the system.

The mixing system to which the basic principles of the present invention are applied can be used, for example, in concert venues, theaters, music production studios, public address systems, vocal guidance systems, etc. Further, the construction (e.g., types of system component apparatus, number of the system component apparatus) of the mixing system to which the basic principles of the present invention are applied is not limited to the example of FIG. 1. Further, as long as the system to which the basic principles of the present invention are applied is an audio signal processing system comprising a plurality of system component apparatus including a plurality of audio signal processing apparatus, the system is not limited to a mixing system and may be an intercommunication system for communicating voices between communication units each provided with a microphone and sound system, an effect imparting system for imparting effects, such as compressor and distortion, to audio signals of guitars and vocals, a reverberation support system for picking up audio signals in a venue via a microphone to thereby generate reverberation supporting audio signals and output the reverberation supporting audio signals to the interior of the venue, plural-track recording/reproducing system for simultaneously recording/reproducing a plurality of audio signals, etc.

The instant embodiment has been described above as having a temporary activation function which temporarily activates an application program in a mixing system, comprising a plurality of audio signal processing apparatus, to permit parameter setting operation but prevents signal processing on audio signals from being started during temporary activation. Such a temporary activation function may also be applied to audio signal processing apparatus, such as a stand-alone digital audio mixer. In this case, the functions divided among the console (parameter editing section) 1, engine (signal processing section) 2 and I/O apparatus (audio signal input/output section) 3 in the above-described mixing system are implemented on the single audio signal processing apparatus, and this audio signal processing apparatus includes: a temporary activation instruction section (selection switch 81) which accepts a temporary application activation instruction for temporarily activating an application program; a resource allocation section which, when the temporary activation instruction has been accepted by the temporary activation instruction section, allocates resources necessary for signal processing by the signal processing section and for acceptance of parameter change operation via the parameter editing section so as to achieve a state where parameter change operation for the application program is acceptable; an invalidation section which, upon acceptance of the temporary application activation instruction, invalidates the signal processing performed by the signal processing section for the application; a full activation instruction section which accepts a full activation instruction for fully activating the application; and a full activation start control section which, upon acceptance of the full activation instruction, cancels the invalidation of the signal processing for the application to cause the signal processing section to perform the signal processing on audio signals.

In the above-described embodiment, the system component apparatus other than the audio signal processing apparatus (namely, non-audio-signal-processing system component apparatus (PC)) is CN-connected to the audio signal processing apparatus (console 1), and no audio signal line is established between the CN-connected non-audio-signal-processing system component apparatus and audio signal processing apparatus so that no audio signal is communicated between the non-audio-signal-processing system component apparatus and the audio signal processing apparatus. However, the present invention is not so limited, and audio signal lines may be established between the non-audio-signal-processing system component apparatus and audio signal processing apparatus so that audio signals can be communicated between the CN-connected non-audio-signal-processing system component apparatus and audio signal processing apparatus. For that purpose, the non-audio-signal-processing system component apparatus and audio signal processing apparatus may be AN-connected with each other so as to establish audio signal lines therebetween. Alternatively, audio signal communication may be achieved between the non-audio-signal-processing system (PC) and the audio signal processing apparatus in an environment where the non-audio-signal-processing system component apparatus and the audio signal processing apparatus is CN-connected with each other (via an ordinary LAN connection), by employing a communication scheme capable of guaranteeing real-time communication, equivalent to audio signal communication through an AN connection, and thereby establishing audio signal lines between the non-audio-signal-processing system component apparatus and audio signal processing apparatus to permit communication of audio signals therebetween. In this case, DAW software activated on the PC 6, which is an example of the system component apparatus other than the audio signal processing apparatus, can be handled as a single audio signal processing apparatus.

This application is based on, and claims priority to, JP PA 2009-229941 filed on 1 Oct. 2009. The disclosure of the priority application, in its entirety, including the drawings, claims, and the specification thereof, are incorporated herein by reference.

What is claimed is:

1. An audio signal processing apparatus comprising:
an input section which inputs an audio signal to said audio signal processing apparatus;
an output section which outputs the audio signal having been subjected to signal processing by a signal processing section; and
one or more processors configured to function as:
said signal processing section which performs the signal processing, based on an application program, on the audio signal input via said input section,
a parameter editing section which accepts operation for changing a value of a parameter to be used in the signal processing,
a temporary activation instruction section which accepts a temporary activation instruction for temporarily activating an application program,
a temporary activation start section which, when the temporary activation instruction has been accepted by said temporary activation instruction section, starts, for the application program of which the temporary activation has been instructed, the signal processing by said signal processing section and acceptance, by said parameter editing section, of parameter change operation, but also sets data indicative of an activation state of the application program, of which the temporary activation has been instructed, to "currently in a temporary activation state" and sets a bypass parameter of the application program to ON,
a full activation instruction section which accepts a full activation instruction for fully activating an application program,
an authorization section which, when the full activation instruction of the application program has been accepted by said full activation instruction section, confirms presence of an access key corresponding to the application program of which the full activation has been instructed and authorizes the full activation of the application program of which the full activation has been instructed,
a full activation start section which, when the full activation of the application program has been authorized by said authorization section, sets data indicative of an activation state of the application program, of which the full activation has been authorized, to "currently in a full activation state" and sets the bypass parameter of the application program, of which the full activation has been authorized, to OFF,
a determination section which, when operation for changing a value of a parameter has been accepted by said parameter editing section, determines whether said data indicative of an activation state of the application program indicates "currently in a temporary activation state" or "currently in a full activation state",
a temporary activation editing section which, when said determination section has determined that said data indicative of an activation state of the application program indicates "currently in a temporary activation state", does not change the value of the parameter to be edited if the parameter to edited is the bypass parameter, but changes the value of the parameter to be edited on the basis of the operation accepted by said parameter editing section if the parameter to be edited is not the bypass parameter, and
a full activation editing section which, when said determination section has determined that said data indicative of an activation state of the application program indicates "currently in a full activation state", changes the value of the parameter on the basis of the operation accepted by said parameter editing section irrespective of a type of the parameter to be edited.

2. The audio signal processing apparatus as claimed in claim 1, wherein the one or more processors are further configured to function as a bypass section which, when the bypass parameter is OFF, causes said signal processing section to perform the signal processing on the audio signal input via said input section and outputs the audio signal, having been subjected to the signal processing, via said output section, and which, when the bypass parameter is ON, outputs the audio signal, input via said input section, via said output section without causing said signal processing section to perform the signal processing on the input audio signal.

3. A non-transitory computer-readable storage medium storing a program for causing one or more processors of an audio signal processing apparatus to perform a method for processing an audio signal, said audio signal processing apparatus comprising: an input section which inputs an audio signal to said audio signal processing apparatus; a signal processing section which performs signal processing, based on an application program, on the audio signal input via said input section; and an output section which outputs the audio signal having been subjected to the signal processing by said signal processing section, said method comprising:
   a step of accepting an editing operation for changing a value of a parameter to be used in the signal processing;
   a step of accepting a temporary activation instruction for temporarily activating an application program;
   a step of, when the temporary activation instruction has been accepted by said step of accepting a temporary activation instruction, starting, for the application program of which the temporary activation has been instructed, the signal processing by said signal processing section and acceptance, by said step of accepting an editing operation, but also setting data indicative of an activation state of the application program, of which the temporary activation has been instructed, to "currently in a temporary activation state" and setting a bypass parameter of the application program to ON;
   a step of accepting a full activation instruction for fully activating an application program;
   an authorization step of, when the full activation instruction of the application program has been accepted by said step of accepting a full activation instruction, confirming presence of an access key corresponding to the application program of which the full activation has been instructed and authorizing the full activation of the application program of which the full activation has been instructed;
   a step of, when the full activation of the application program has been authorized by said authorization step, setting data indicative of an activation state of the application program, of which the full activation has been authorized, to "currently in a full activation state" and setting the bypass parameter of the application program, of which the full activation has been authorized, to OFF;
   a step of, when operation for changing a value of a parameter has been accepted by said step of accepting an editing operation, determining whether said data indicative of an activation state of the application program indicates "currently in a temporary activation state" or "currently in a full activation state";
   a step of, when said step of determining has determined that said data indicative of an activation state of the application program indicates "currently in a temporary activation state", causing said step of accepting an editing operation not to change the value of the parameter to be edited if the parameter to edited is the bypass parameter, but causing said step of accepting an editing operation to change the value of the parameter to be edited on the basis of the operation accepted by said step of accepting an editing operation if the parameter to be edited is not the bypass parameter; and
   a step of, when said step of determining has determined that said data indicative of an activation state of the application program indicates "currently in a full activation state", causing said step of accepting an editing operation to change the value of the parameter on the basis of the operation accepted by said step of accepting an editing operation irrespective of a type of the parameter to be edited.

4. A non-transitory computer-readable storage medium as claimed in claim 3, which further comprises a step of, when the bypass parameter is OFF, causing said signal processing section to perform the signal processing on the audio signal input via said input section and outputs the audio signal, having been subjected to the signal processing, via said output section, and which, when the bypass parameter is ON, outputs the audio signal, input via said input section, via said output section without causing said signal processing section to perform the signal processing on the input audio signal.

* * * * *